United States Patent [19]
Cameron et al.

[11] Patent Number: 5,325,526
[45] Date of Patent: Jun. 28, 1994

[54] TASK SCHEDULING IN A MULTICOMPUTER SYSTEM

[75] Inventors: Donald F. Cameron; Thomas E. Merrow; Paul R. Pierce, all of Portland, Oreg.

[73] Assignee: Intel Corporation, Santa Clara, Calif.

[21] Appl. No.: 881,879

[22] Filed: May 12, 1992

[51] Int. Cl.$^5$ .............................................. G06F 9/46
[52] U.S. Cl. ........................... 395/650; 364/DIG. 1; 364/281.8; 364/281.4; 364/230.3
[58] Field of Search ............... 395/202, 650, 250, 325, 395/575; 371/11, 9.1, 36

[56] References Cited

U.S. PATENT DOCUMENTS

| | | | |
|---|---|---|---|
| 4,658,351 | 4/1987 | Teng | 395/650 |
| 4,805,107 | 2/1989 | Kieckhafer | 395/650 |

OTHER PUBLICATIONS

Feitelson et al., Distributed Hierarchical Control for Parallel Processing; IEEE Computer, May 1990, pp. 65-76.

Milenkovic, Milan; Operating Systems: Concepts and Design; 1987, pp. 111-117.

*Primary Examiner*—Thomas M. Heckler
*Attorney, Agent, or Firm*—Blakely, Sokoloff, Taylor & Zafman

[57] ABSTRACT

An improved method of executing a plurality of computer application programs on a multicomputer is disclosed. The present invention pertains to a task scheduling system in a multicomputer having nodes arranged in a network. The present invention comprises an allocator and scheduler component, which comprises processing logic and data for implementing the task scheduler of the present invention. The allocator and scheduler operates in conjunction with a partition to assign tasks to a plurality of nodes. A partition is an object comprising a plurality of items of information and optionally related processing functions for maintaining a logical environment for the execution of tasks of one or more application programs. Application programs are allowed to execute on one or more nodes of a partition. Moreover, a node may be assigned to more than one partition and more than one application program may be loaded on a single node. The allocator and scheduler provides allocator procedures used by application programs for identifying a node or group of nodes for inclusion in a partition. The allocator and scheduler also provides several data areas for the storage of information relevant to the allocation and scheduling of tasks. These data areas of the allocator and scheduler include a partition data area, an application data area, and a layer data area. The present invention provides a means and method for hierarchically linking application programs, layers, and partitions together to provide an optimal execution environment for the execution of a plurality of tasks in a multicomputer.

22 Claims, 21 Drawing Sheets

TASK SCHEDULING IN A MULTICOMPUTER SYSTEM

BACKGROUND OF THE INVENTION

1. Field Of The Invention

The present invention relates to the field of multicomputer systems having a plurality of nodes (i.e. processors with independent memories) arranged in a network. Specifically, the present invention relates to the control of application programs executing in a multicomputer system.

2. Prior Art

Many task scheduling systems exist in the prior art. Most of these prior art task schedulers exist within operating systems designed for single processor computer systems or multiprocessor systems where the processors share memory. Task schedulers manage the execution of independent tasks in support of application programs executing in the computer system. Application programs (hereinafter applications) comprise processing logic for performing a specific function for a computer user or for the manipulation of a specific type of data. Applications are typically distinguished from operating system software of which a task scheduler is a part. Task schedulers are used mainly to optimize the allocation of available processor execution time across a plurality of prioritized tasks. In this manner, a single processor may be used to execute a plurality of different tasks.

Recently, shared memory computer system architectures have evolved into multicomputer architectures. Multicomputer systems typically comprise a two or three dimensional array (mesh) of independent processors having independent memories, wherein each processor is capable of executing different instruction streams simultaneously. Although multicomputer systems provide a greatly increased capacity for processing throughput, scheduling tasks in multicomputer systems greatly increases in complexity. In order to deal with this complexity, some prior art multicomputer task scheduling systems impose severe processing constraints. For example, some prior art multicomputer task schedulers allow only a single application program to be executed at a time. By imposing this constraint, a problem is eliminated wherein a task of a first application program is indefinitely suspended while tasks of a second application are executing. A significant disadvantage of this prior art approach, however, is that additional applications must be queued for execution until the currently executing application has terminated. Queuing applications for execution is a significant drawback because any single application may execute for an indeterminate length of time (i.e. hours or days).

Other prior art multicomputer task schedulers impose a restriction of limiting any single application to execution by a predetermined subset of the available processors. The multicomputer is thereby divided into a plurality of physical partitions of processors. A single application is restricted to execution only within a single partition. Similarly, each physical partition may only have a single application executing on processors within the partition. This partitioning scheme typically reflects the physical attributes of the multicomputer interconnection scheme such as sub-cubes of a hyper-cube or rectangles of a mesh of processors. This method forces a particular processor or node to belong to only one partition. Although this prior art method of physical partitioning allows a small number of applications to execute at once in a multicomputer, a number of disadvantages also exist. The main disadvantage with this method is the inability to optimally predetermine the necessary size of a partition for a particular application. In practice, a multicomputer system may be used to execute a number of various applications. Some computation intensive applications may benefit from the allocation of many processors for use by the application. On the other hand, other applications may require relatively few processing resources. Because of these processing dynamics, the physical pre-allocation of a set of processors for any particular application is unlikely to yield the appropriate level of computing resources for a particular application. A second disadvantage of the prior art method of physical partitioning is an implicit restriction imposed on the number of applications which can be executed concurrently on the multicomputer system. Because processors of a multicomputer system are solely allocated to a particular application, it will be apparent that the multicomputer system may only execute a number of applications corresponding to the number of partitions available.

Thus, a better task scheduling system is needed for multicomputer systems.

SUMMARY OF THE INVENTION

The present invention is an improved method of executing a plurality of computer application programs on a multicomputer in order to achieve a high degree of utilization of the resources of the multicomputer without sacrificing the performance of the applications. The present invention also provides a means for controlling the resources that are allocated to individual users or groups of users of a multicomputer. It will be apparent to those skilled in the art that the present invention can be used in networks of a topology other than a mesh.

The present invention pertains to a task scheduling system in a multicomputer having nodes (i.e. processors with independent memories) arranged in a network. These conventional multicomputers comprise a plurality of nodes, each of which are processors capable of independently executing a different stream of processing instructions. Each of the nodes communicate with each other via a network of communication lines that link each node in a mesh configuration.

In the present invention, the nodes (i.e. processors) of a multicomputer are assigned to partitions. Application programs are allowed to execute on one or more nodes of a partition. Moreover, a node may be assigned to more than one partition and more than one application program may be loaded on a single node. The present invention provides a method of scheduling in which only one application program is active at a time on any one node and an entire application program is active at once across all of the nodes on which the application program is loaded.

The present invention comprises an allocator and scheduler component, which comprises processing logic and data for implementing the task scheduler of the present invention. The allocator and scheduler operates in conjunction with a partition to assign tasks to a plurality of nodes. The allocator and scheduler may and typically does operate with a plurality of partitions.

A partition in the present invention is an object comprising a plurality of items of information and optionally related processing functions for maintaining a logical environment for the execution of tasks of one or more application programs. One significant component of a partition is a logical to physical mapping between a logical group of nodes and a physical group of nodes. Using an abstract logical to physical mapping, as in the present invention, it is not necessary for tasks of a particular application to be permanently assigned to a physical group of nodes. In this manner, better optimization of the processing power provided in a multicomputer is achieved.

The allocator and scheduler comprises processing logic and data for allocating nodes to specific application programs and for scheduling application programs for execution. The allocator portion provides allocator procedures used by application programs for identifying a node or group of nodes for inclusion in a partition. In this manner, the allocator is used to make a partition. An allocator procedure called Make Partition is provided for creating a new partition. Similarly, the allocator is used to remove a partition previously created. A Remove Partition procedure is provided for this purpose. The allocator is also used to initialize applications in a previously created and specified partition. As part of the application initialization process, tasks associated with a particular partition to be initialized are retrieved and loaded into the nodes associated with the specified partition. The Initialize Application procedure is provided as part of the allocator for initializing a new application. The Remove Application procedure is also provided as part of the allocator for removing a previously initialized application. Finally, a Task Server Loop is provided to dispatch tasks and handle inter-task message traffic. The scheduler procedures include a Schedule Partition procedure, a Roll Out Partition procedure, and a Roll In Partition procedure.

The allocator and scheduler portion also provides several data areas for the storage of information relevant to the allocation and scheduling of tasks. The first item of these data blocks is a logical to physical node map. The logical to physical node map is an array of physical node numbers where the array index represents the logical node number of an application program or partition with which the physical node is associated. The second data area is a node bit map. The node bit map describes the nodes of a rectangular group of processors that are allocated to the partition. Another data area of the allocator and scheduler is a partition data area. A partition data area is a description of a logical execution environment for one or more application programs. Another data area of the allocator and scheduler is an application data area. Application data is used to describe an application program. Another data area of the allocator and scheduler is a layer data area. Layer data is used to manage a list of consumers which are using the nodes of a partition. Consumers are either application programs or other partitions (i.e. sub-partitions). The present invention provides a means and method for hierarchically linking application programs, layers, and partitions together to provide an optimal execution environment for the execution of a plurality of tasks in a multicomputer.

It is, therefore, an object of the present invention to provide a multicomputer task scheduler using logical processor (node) partitioning in which sets of nodes are assigned to partitions, and in which a node may be assigned to one or more partitions at a time, and in which one or more applications may be executed within a partition, and in which a node may have one or more applications loaded on it. It is a further object of the present invention to provide a multicomputer task scheduler allowing the scheduling of one or more applications within a partition such that only one application at a time is active on any one node and an entire application is scheduled at once across all of the nodes on which it is loaded. It is a further object of the present invention to provide a multicomputer task scheduler providing an ability to assign nodes within a partition to an arbitrarily deep hierarchical arrangement of sub-partitions. It is a further object of the present invention to provide a multicomputer task scheduler allowing sub-partitions to be recursively scheduled. It is a further object of the present invention to provide a multicomputer task scheduler providing a means for arranging applications in a series of layers, one layer being scheduled at a time. It is a further object of the present invention to provide a multicomputer task scheduler that arranges applications and sub-partitions in a series of layers, one layer being scheduled at a time. It is a further object of the present invention to provide a multicomputer task scheduler wherein scheduling priorities of applications and sub-partitions may be acquired by the partitions which contain them. It is a further object of the present invention to provide a multicomputer task scheduler wherein partitions include an attribute used to limit the scheduling priority which may be acquired by a partition from the applications and sub-partitions contained within it. It is a further object of the present invention to provide a multicomputer task scheduler wherein the partitions include an attribute which specifies the period of time for which applications and/or sub-partitions contained within are made active.

These and other objects of the present invention will become apparent as illustrated and described in the following detailed description of the preferred embodiment.

DETAILED DESCRIPTION OF THE PREFERRED EMBODIMENT

The present invention is a task scheduler for a multicomputer system. In the following description, numerous specific details are set forth in order to provide a thorough understanding of the present invention, however, it will be apparent to one of ordinary skill in the art that these specific details need not be used to practice the present invention. In other circumstances, well known structures, circuits, and interfaces have not been shown in detail in order not to obscure unnecessarily the present invention.

The present invention is an improved method of executing a plurality of computer application programs on a multicomputer in order to achieve a high degree of utilization of the resources of the multicomputer without sacrificing the performance of the applications. The present invention also provides a means for controlling the resources that are allocated to individual users or groups of users of a multicomputer.

Figure 1:
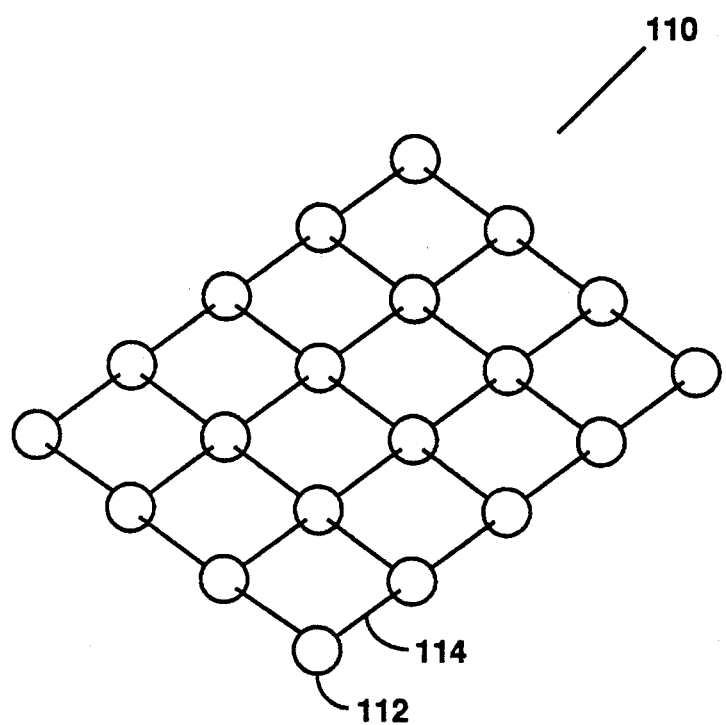
FIG. 1 is an illustration of a prior art two dimensional multicomputer system.

The present invention pertains to a task scheduling system in a multicomputer having nodes (i.e. processors with independent memories) arranged in a network. A two dimensional mesh multicomputer 110 is illustrated in FIG. 1. These conventional multicomputers comprise a plurality of nodes 112, each of which are processors capable of independently executing a different stream of processing instructions. Each of the nodes communicate with each other via a network of communication lines 114 that link each node in a mesh configuration.

Figure 2:
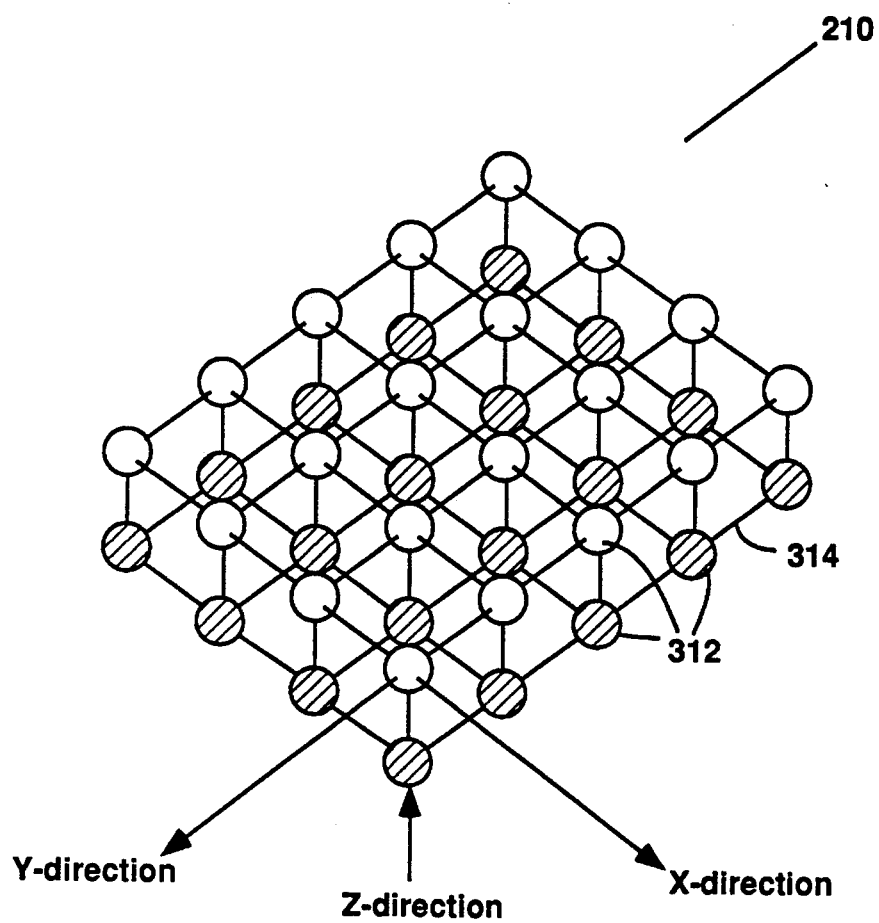
FIG. 2 illustrates a prior art three dimensional mesh multicomputer system.

A three dimensional mesh multicomputer 210 is illustrated in FIG. 2. Again this conventional multicomputer comprises a plurality of nodes 312 linked in a three dimensional cube by communication lines 314. It will be apparent to those skilled in the art after having read the following detailed description that the present invention may be employed in both two and three dimensional multicomputer architectures. Similarly, the present invention may be employed in multicomputer architectures that have a structure other than a mesh or cube interconnection.

The present invention is implemented using the i860 ® microprocessor manufactured by the assignee of the present invention. The i860 mark is a registered trademark of the assignee of the present invention. A method of interconnecting i860 processors in a multicomputer configuration, is well known to those of ordinary skill in the art.

Figure 3:
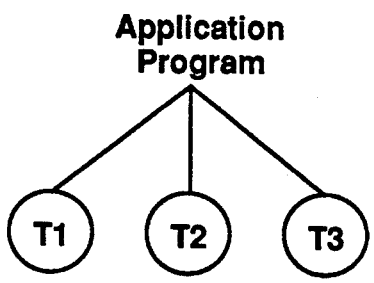
FIG. 3 illustrates the tasks that form an application program.

Application programs, or other software executing on the multicomputer, are typically organized as a group of independent tasks that may be executed by a single processor or using a plurality of processors. Such a conventional task organization for an application program is illustrated in FIG. 3. The application program illustrated in FIG. 3 comprises tasks T1, T2, and T3. Each of these tasks may execute concurrently on different processors in a multicomputer and typically pass messages between each of the tasks. Other implementations of this application model may denote tasks by other names such as processes, modules, etc. This application task model is well known to those ordinarily skilled in the art.

Figure 4:
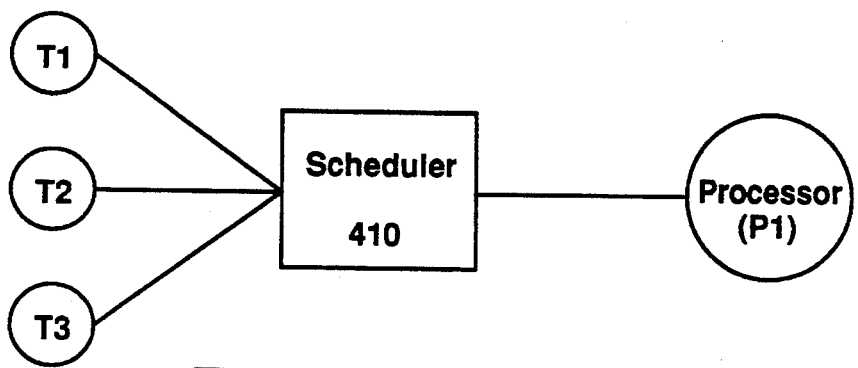
FIG. 4 illustrates a single processor task scheduler.
Figure 5:
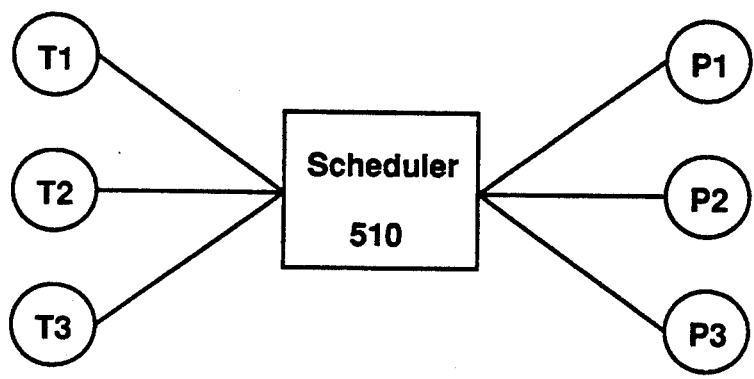
FIG. 5 illustrates a prior art multicomputer task scheduler.

Referring to FIGS. 4 and 5, a prior art task scheduler is shown operating in two hardware architectures. Each of these task schedulers comprise operating system software responsible for controlling the execution of a plurality of tasks on one or more processors. In FIG. 4, scheduler 410 is responsible for controlling the execution of tasks T1, T2, and T3 on a single processor P1. In a typical implementation of this single processor architecture, each task, T1, T2, and T3, is given a predetermined time slice ("activation quantum") during which a single task is allowed to execute. The scheduler 410 monitors the execution times for each of the tasks. When a currently executing task has executed for a period of time equal or greater to the predetermined time quantum, scheduler 410 suspends execution of the currently executing task and initiates the execution of a subsequent task waiting in a queue of tasks ready for execution. Some prior art task schedulers also suspend a currently executing task when the current task executes a blocking system call. A "blocking" system call is a request by a task for service to system resource that may cause the processor to idle until the requested resource responds. Tasks of an application program always run to the end of their activation quantum or until a blocking system call is made, at which time, the scheduler determines if there is another application task ready to run. If another task in a scheduling queue is ready to run, the currently executing task is suspended and the next task in the scheduling queue of the highest priority is activated. In the preferred embodiment, the activation quantum can be set by the user in increments of one second.

The scheduler 410 described above, in relation to FIG. 4, uses a conventional interactive scheduling method used in the Unix operating system. In Unix, tasks or processes run for a short time slice (typically one-tenth of a second) or until they do a blocking system call, at which time the processes are rescheduled by the task scheduler. Interactive scheduling using Unix, or other operating systems in a single processor environment, is well known to those of ordinary skill in the art.

Referring to FIG. 5, a task scheduler 510 used in the prior art for controlling the execution of a plurality of tasks T1, T2, and T3 in a multiple processor environment comprising processors P1, P2, and P3 is illustrated. A multiple processor environment has a plurality of processors that share a common memory. Scheduler 510 is responsible for assigning each task (T1, T2, and T3) to one of the available processors (P1, P2, or P3). In this way, tasks T1, T2, and T3 can run concurrently. A multiple processor environment, however, is not the multicomputer architecture described in relation to FIGS. 1 and 2. Therefore, the task schedulers of a multiple processor environment are fundamentally different from a multicomputer.

Traditional multicomputer task schedulers assign tasks to processors using a rigidly enforced set of predefined rules. Typically, these rules impose severe processing constraints on the task executing in the multicomputer. For example, some conventional multicomputer task schedulers allow only a single application program and its associated tasks to be executed at a time. By imposing this constraint, a problem is eliminated wherein a task of a first application program is indefinitely suspended while tasks of a second application are executing. A significant disadvantage of this prior art approach, however, is that additional applications must be queued for execution until the currently executing application has terminated.

Other prior art multicomputer task schedulers impose a restriction of limiting any single application to execution by a predetermined subset of the available processors. The multicomputer is thereby divided into a plurality of physical partitions of processors. A single application is restricted to execution only within a single partition. Similarly, each physical partition may only have a single application executing on processors within the partition. This partitioning scheme typically reflects the physical attributes of the multicomputer interconnection scheme such as sub-cubes of a hyper-cube or rectangles of a mesh of processors. This method forces a particular processor or node to belong to only one partition. Although this prior art method of physical partitioning allows a small number of applications to execute at once in a multicomputer, a number of disadvantages also exist. The main disadvantage with this method is the inability to optimally predetermine the necessary size of a partition for a particular application. In practice, a multicomputer system may be used to execute a number of various applications. Some computation intensive applications may benefit from the allocation of many processors for use by the application. On the other hand, other applications may require relatively few processing resources. Because of these processing dynamics, the physical pre-allocation of a set of processors for any particular application is unlikely to yield the appropriate level of computing resources for a particular application. A second disadvantage of the prior art method of physical partitioning is an implicit restriction imposed on the number of applications which can be executed concurrently on the multicomputer system. Because processors of a multicomputer system are solely allocated to a particular application, it will be apparent that the multicomputer system may only execute a number of applications corresponding to the number of partitions available.

The present invention is a task scheduler and method for executing multiple application programs on a multicomputer. In the present invention, the nodes (i.e. processors) of a multicomputer are assigned to partitions. Application programs are allowed to execute on one or more nodes of a partition. Moreover, a node may be assigned to more than one partition and more than one application program may be loaded on a single node. The present invention provides a method of scheduling in which only one application program is active at a time on any one node and an entire application program is active at once across all of the nodes on which the application program is loaded.

Figure 6:
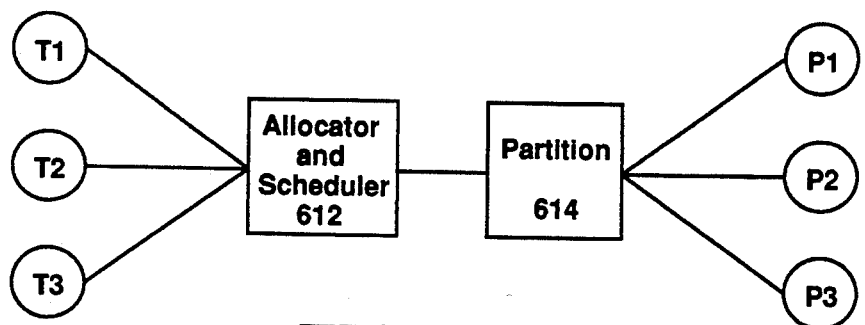
FIG. 6 is a block diagram of the task scheduler of the present invention.

Referring now to FIG. 6, the task scheduler of the present invention is illustrated. The present invention comprises an allocator and scheduler component 612, which comprises processing logic and data for implementing the task scheduler of the present invention. The allocator and scheduler 612 operates in conjunction with partition 614 to assign tasks to a plurality of nodes P1, P2 and P3. As will be described below, allocator and scheduler 612 may and typically does operate with a plurality of partitions 614.

A partition in the present invention is an object comprising a plurality of items of information and optionally related processing functions for maintaining a logical environment for the execution of tasks of one or more application programs. Each of the items of information maintained within a partition is illustrated and described in relation to FIG. 9. One significant component of a partition is a logical to physical mapping between a logical group of nodes and a physical group of nodes. Using an abstract logical to physical mapping, as in the present invention, it is not necessary for tasks of a particular application to be permanently assigned to a physical group of nodes. In this manner, better optimization of the processing power provided in a multicomputer is achieved. The structure and use of partitions in the present invention is described in more detail below.

Figure 7:
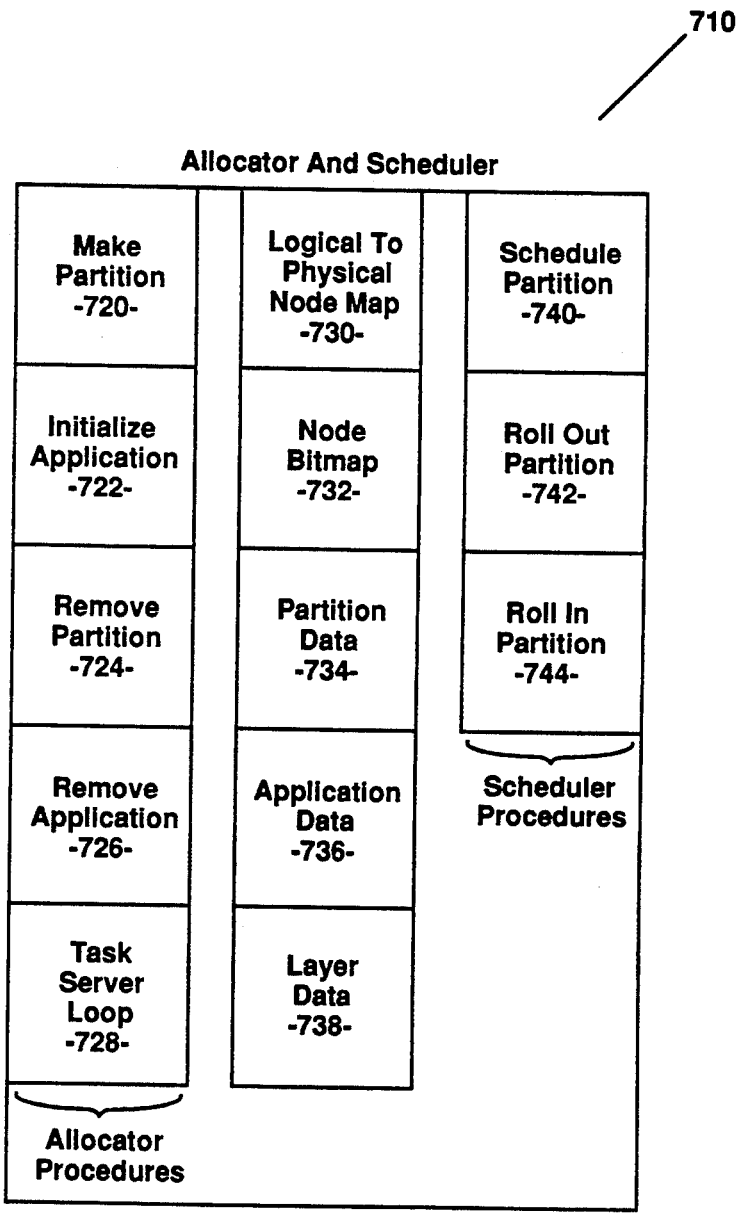
FIG. 7 is a block diagram of the contents of the allocator and scheduler of the preferred embodiment.

Referring now to FIG. 7, the content of allocator and scheduler 710 is illustrated. The allocator and scheduler 710 comprises processing logic and data for allocating nodes to specific application programs and for scheduling application programs for execution. The allocator portion provides allocator procedures used by application programs for identifying a node or group of nodes for inclusion in a partition. In this manner, the allocator is used to make a partition. An allocator procedure called Make Partition 720 is provided for creating a new partition. This procedure is described below. Similarly, the allocator is used to remove a partition previously created. A Remove Partition procedure 724 is provided for this purpose. The allocator is also used to initialize applications in a previously created and specified partition. As part of the application initialization process, tasks associated with a particular partition to be initialized are retrieved and loaded into the nodes associated with the specified partition. The Initialize Application procedure 722 is provided as part of the allocator for initializing a new application. The Remove Application procedure 726 is also provided as part of the allocator for removing a previously initialized application. Finally, a Task Server Loop 728 is provided to dispatch tasks and handle inter-task message traffic.

The allocator and scheduler portion 710 also provides several data areas for the storage of information relevant to the allocation and scheduling of tasks. The first item of these data blocks is a logical to physical node map 730. The logical to physical node map is an array of physical node numbers where the array index represents the logical node number of an application program or partition with which the physical node is associated. The definition of the logical to physical node map in the C programming language is as follows:

typedef long LP_MAP_ENTRY_T;

typedef LP_MAP_ENTRY_T *LP_MAP_T;

The node bit map block 732 describes the nodes of a rectangular group (submesh) of processors that are allocated to the partition. The definition of the node bit map data structure 732 is provided below in the C programming language:

```
typedef unsigned long COLUMN_MAP_T;
typedef struct {
    int                 rows;
    int                 cols;
    COLUMN_MAP_T        colmap;
}           BITMAP_T;
```

Figure 8:
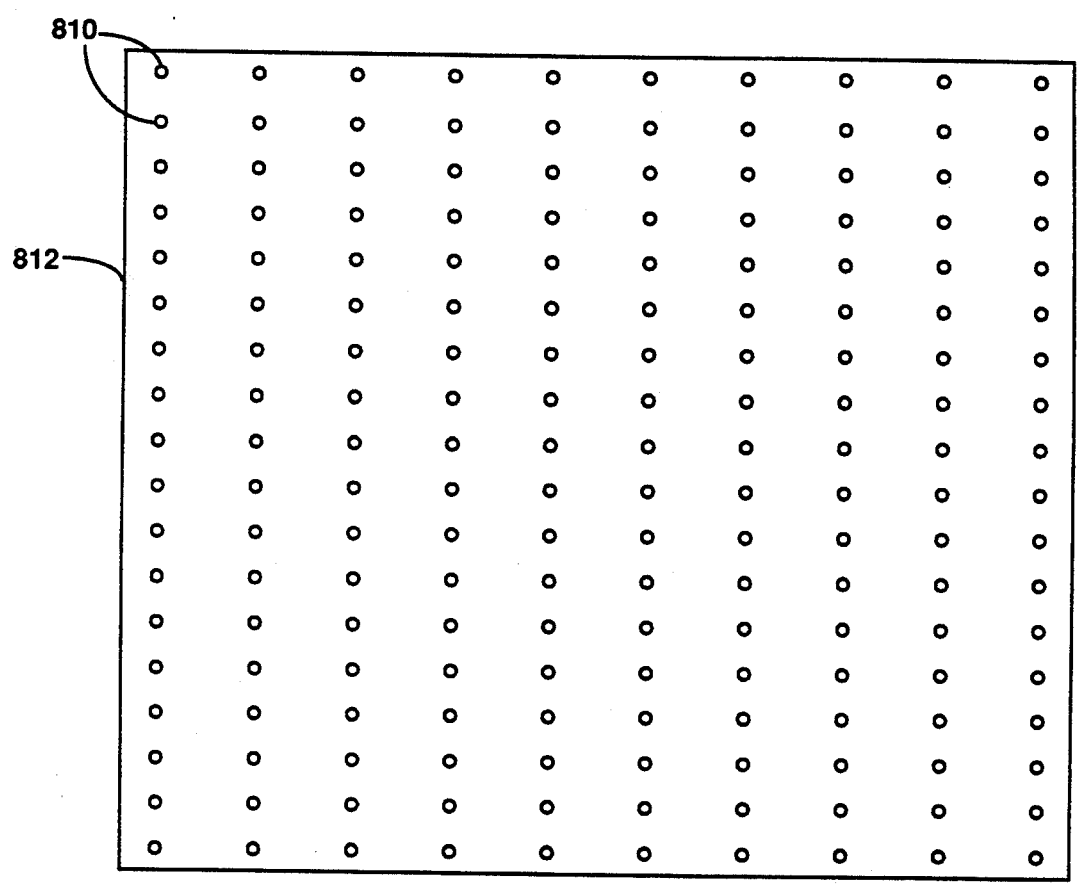
FIG. 8 illustrates the bitmap structure.

Referring to FIG. 8, an example of a bit map structure, corresponding to node bit map 732, is illustrated. In FIG. 8, each node 810 of a multicomputer may be represented by a bit in node bit map 732. The row and column fields of the node bit map data structure are used to define the nodes of the multicomputer that are associated with the bits in the node bit map 732. The node bit map 732 may be used to associate applications or partitions with nodes.

Referring again to FIG. 7, partition data 734 contains information about a partition. A partition is a description of a logical execution environment for one or more application programs. Partition information includes the scheduling characteristics, the protection attributes, the nodes allocated to the partition, and the logical to physical node mapping. This partition information also contains a pointer to a list of layers which describe the nodes which have been allocated from the partition, and pointers which allow the partition to be an element of a linked list pointed to by a layer. Layers are described in detail below. Partition data 734 is described in more detail in FIG. 9. An example of a partition data structure is defined in the C programming language in the Appendix provided herein just prior to the claims section.

Application data 736 is used to describe an application program. Application data 736 comprises information including the identity of the nodes assigned to the application, the priority of the application, and the logical to physical node mapping. Similar to the partition data structure, the application data structure contains pointers which allow the application to be an element of a linked list to which a layer points. The content of the application data 736 is illustrated in more detail in FIG. 10. An example of an application data structure is defined in the C programming language in the Appendix provided herein just prior to the claims section.

Layer data 738 is used to manage a list of consumers which are using the nodes of a partition. Consumers are either application programs or other partitions (i.e. sub-partitions). A layer is an arrangement of applications and/or sub-partitions that are scheduled at once across a partition. The layer data structure 738 comprises information including identity of the nodes of the partition that are allocated by a list of consumers to which the layer points. Layer data 738 also includes the priority of the highest priority consumer to which the layer points. Layer data 738 is described in more detail in connection with FIG. 11. An example of a layer data structure is defined in the C programming language in the Appendix provided herein just prior to the claims section.

Figure 9:
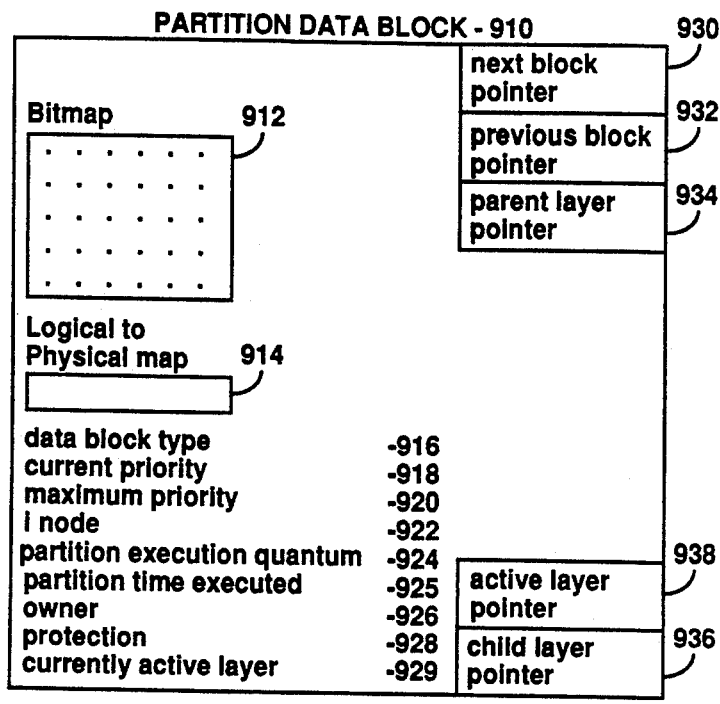
FIG. 9 illustrates the content of a partition data block.

Referring to FIG. 9, the content of partition data block 910 is illustrated. The partition data 734 maintained by the allocator and scheduler 710 is equivalent to the data structure shown in FIG. 9. Partition data block 910 comprises node bit map 912, which is equivalent to node bit map 732, illustrated in FIG. 7 and described above. Partition data block 910 also includes logical to physical map 914, which is equivalent to logical to physical node map 730, illustrated in FIG. 7 and described above. Partition data block 910 also includes a data block type field 916, which is used to distinguish a partition data block from an application data block. In the preferred embodiment, partition data blocks and application data blocks can be maintained in the same doubly-linked list. Data block type field 916 is, therefore, needed to differentiate between a partition data block and an application data block. Partition data block 910 also includes a current priority field 918. Maximum priority field 920 is also provided. Application programs associated with (i.e., linked to) partitions have priorities associated with the applications. A partition acquires the effective priority of the highest priority application program contained within the partition or with any of its sub-partitions. The current priority field 918 is used for the storage of the value corresponding to the highest priority of the application or subpartition of the partition. The current priority field 918 may dynamically change as the priorities of associated application programs or sub-partitions change priority. Maximum priority field 920 is provided to limit the value held in the current priority field 918 to a maximum priority level. In this manner, a partition may be restricted from acquiring a priority high enough to impede the operation of other partitions of the system.

Partition data block 910 also includes an inode field 922. The inode field 922 is used to distinctively identify the partition. In the preferred embodiment, a Unix file system pointer or inode is used to distinctly identify the partition. Access to and use of a Unix inode is well known to those of ordinary skill in the art. In an alternative embodiment, other distinctive identifiers such as a numeric or alphanumeric value may be used to identify a partition. Partition data block 910 also includes a partition execution quantum field 924. Field 924 is used for the storage of a value corresponding to the length of time that tasks of a partition may execute in a single time slice. The partition time executed field 925 is provided to retain the length of time that the currently running partition has actually been executing in the current time slice. Partition data block 910 also contains an owner field 926 for assigning a particular user group to a partition. Partition data block 910 also contains a protection field 928 for assigning an access mode to the contents of the partition data block. Partition data block 910 also contains a currently active layer field 929 to retain a pointer to the partition layer that is currently executing.

Partition, application, and layer data blocks are all arranged in the preferred embodiment in doubly linked lists. In support of this linked arrangement, each data block includes two linked list pointers. Referring again to FIG. 9, next block pointer 930 and previous block pointer 932 are used to link data blocks together in a forward or backward direction, respectively. Because the use of linked lists is well known in the art, a set of functions for inserting and deleting data blocks in the linked list using pointers 930 and 932 in generic data blocks is well known in the art. The use of partition, application, and layer data blocks, however, is not well known in the art. The present invention benefits from the conventional use of doubly linked lists. Partition data block 910 also contains parent layer pointer 934 and child layer pointer 936. Because a partition may contain one or more layers, the partition layers are linked using parent layer pointer 934 and child layer pointer 936. Child layer pointer 936 provides the forward link and parent layer pointer 934 provides the backward link. The use of these pointers is described in more detail in connection with FIG. 12.

Figure 10:
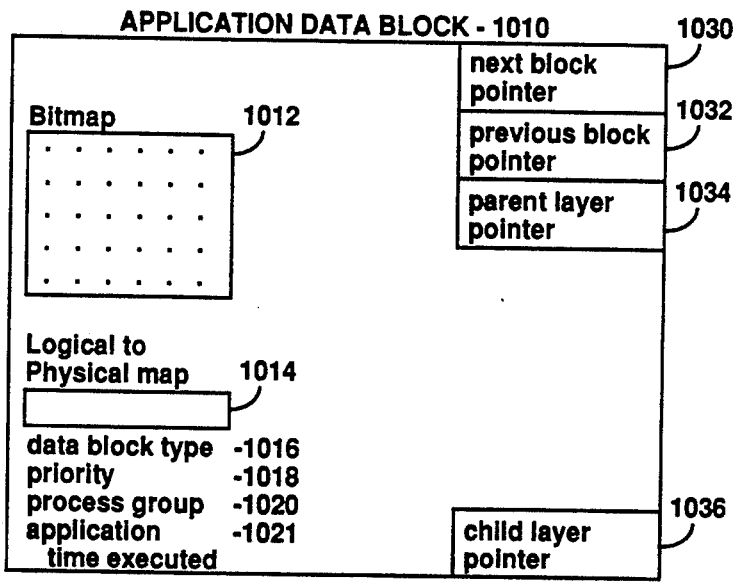
FIG. 10 illustrates the contents of an application data block.

Referring now to FIG. 10, the content of application data block 1010 is illustrated. The application data structure describes an application program loaded on nodes of the multicomputer. Application data block 1010 comprises bit map 1012, which describes the nodes of the multicomputer in which tasks of the application program are loaded. Bit map 1012 is similar to node bit map 732, illustrated in FIG. 7 and described above. Application data block 1010 also includes a logical to physical node mapping 1014, which is used to maintain a level of abstraction between the application program and the physical nodes executing the application. Logical to physical mapping 1014 is similar to the logical to physical node map 730, illustrated in FIG. 7 and described above. Application data block 1010 also includes data block type 1016, which is used to distinguish an application data block from a partition data block. Because an application data block and a partition data block may be linked in the same linked list, a data block type field 1016 is necessary to differentiate between the two types of data blocks. Application data block 1010 also includes a priority, 1018, which defines the priority associated with the application program. As an application is linked to a partition, the priority 1018 of the application is inherited by the linked partition, as long as the application's priority is not greater than the maximum priority assigned to the partition. Application data block 1010 also includes a process group field 1020, which is used to associate an application program with a group of application time executed field 1021, which indicates the length of time the application has executed during a scheduling period.

Figure 11:
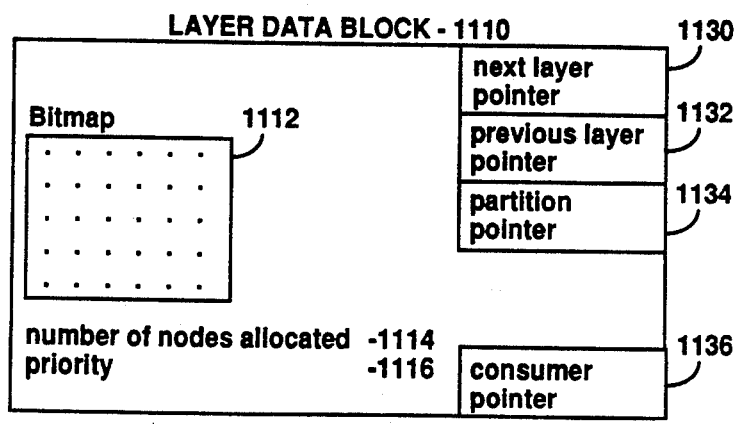
FIG. 11 illustrates the content of a layer data block.

Referring now to FIG. 11, the contents of a layer data block 1110 is illustrated. A layer data structure is used to point to a list of consumers of a partition. Consumers include application programs and sub-partitions which are using the nodes of a partition. A layer points to a set of consumers which do not overlap; i.e., no two consumers use the same node. If a partition contains a plurality of application programs which overlap (i.e. at least one node is common to more than one application), there will be more than one layer per partition. The layer data structure contains information identifying the nodes of the partition that are allocated by the list of consumers to which the layer points. The layer data structure also contains information pertaining to the priority of the consumer to which the layer points. Layer data block 1110 comprises node bit map 1112, which identifies the nodes of the partition allocated to the layer. Node bit map 1112 is equivalent to node bit map 732, illustrated in FIG. 7 and described above. Layer data block 1110 also includes a data item 1114, identifying the number of nodes allocated to the layer. Layer data block 1110 also includes a priority field 1116, used to retain the priority level of the highest priority consumer to which the layer points.

Figure 12:
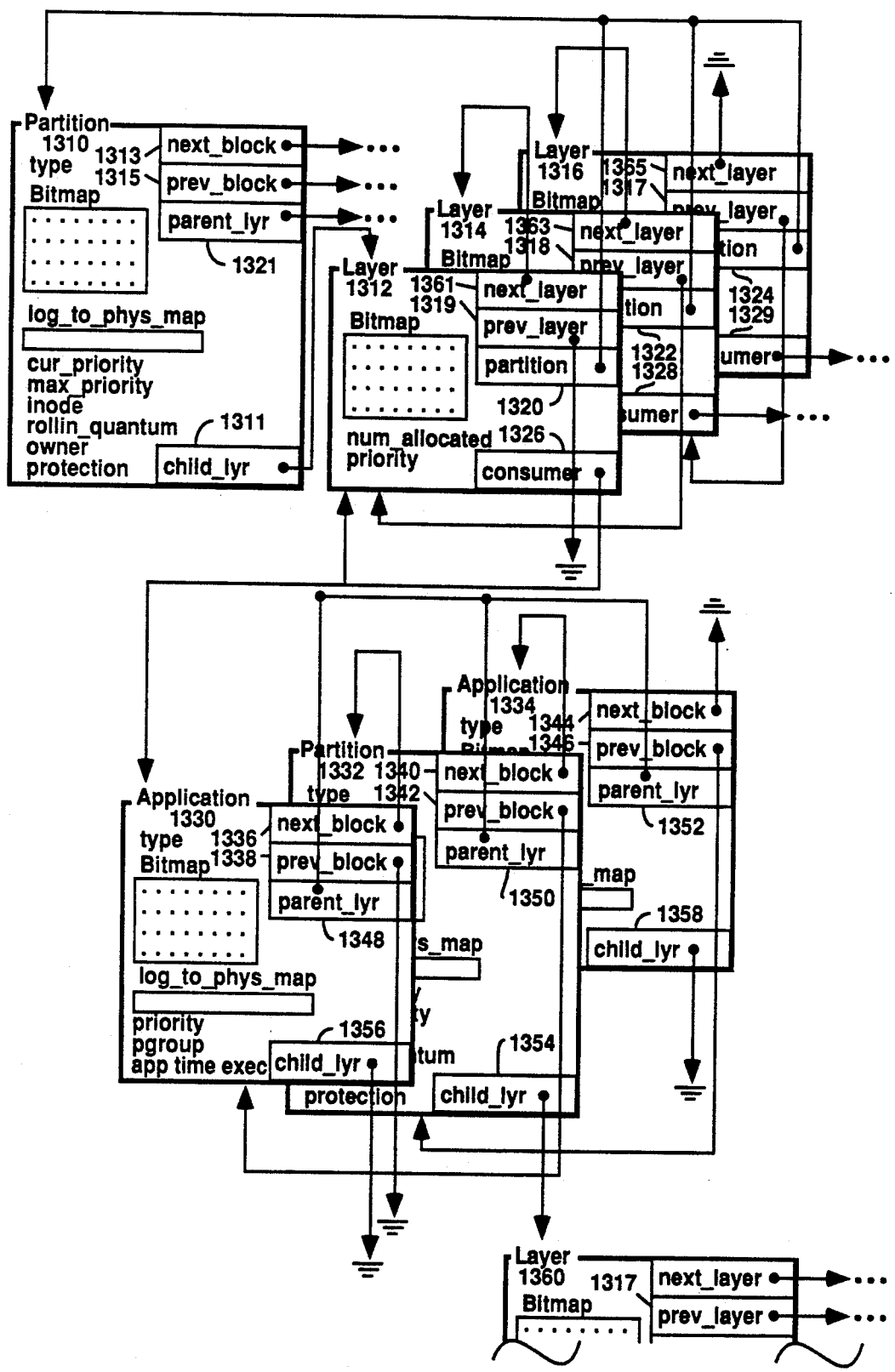
FIG. 12 illustrates the linking of data blocks in an example of the present invention.

Referring now to FIG. 12, an example of the relationship between partitions, application programs, and layers is illustrated. In the example of FIG. 12, a partition 1310 is shown to include information equivalent to the information illustrated in FIG. 9 and described above. It will be apparent to those skilled in the art that partition 1310 is linked into a doubly linked list (not shown) as indicated by the next block pointer 1313 and previous block pointer 1315 fields. Similarly, partition 1310 may be a sub-partition linked with a higher level layer (not shown). The parent layer field 1321 of partition 1310 may, therefore, point to a higher level structure of layers (not shown). The child layer pointer 1311 of partition 1310, in the example of FIG. 12, points to layer 1312. The next layer pointer 1361 of layer 1312 points to a subsequent layer 1314, which, in turn, points to yet another subsequent layer 1316 using the next layer pointer 1363 of layer 1314. The backward link through the list of layers is provided by previous layer pointer 1317 of layer 1316, which points to the next higher layer, 1314. The previous layer pointer 1318 of layer 1314 points to layer 1312. Because layer 1312 is the topmost layer, previous layer pointer 1319 of layer 1312 is set to a null value. Similarly, because layer 1316 is the bottom-most layer, next layer pointer 1365 of layer 1316 is set to a null value. Each layer in the stack of layers (i.e. layers 1312, 1314, and 1316) referenced directly or indirectly by the child layer pointer 1311 of partition 1310 contains a partition pointer that references back to parent partition 1310. For example, partition pointer 1320 of layer 1312, partition pointer 1322 of layer 1314 and partition pointer 1324 of layer 1316 all reference back to partition 1310 as shown in FIG. 12. In this manner, partition 1310 may have an arbitrarily deep stack of layers associated with the partition. Each of the layers in the stack of layers associated with partition 1310 (i.e., layer 1312, layer 1314, and layer 1316), contain a consumer pointer that points to a consumer of the layer within the partition. A "consumer" is either an application program or another partition (i.e. a sub-partition). As shown in FIG. 12, consumer pointer 1326 of layer 1312 references an application program data block 1330. The consumer pointers of each of the other layers (i.e., consumer pointer 1328 of layer 1314 and consumer pointer 1329 of layer 1316) both point to other consumers of their respective layer (not shown).

Application data block 1330 comprises information equivalent to the information illustrated in FIG. 10 and described above. In general, application data block 1330 comprises information for referencing and executing an application program on the multicomputer. Application data block 1330 or any other consumer referenced by consumer pointer 1326 represents one element in a linked list of consumers. In the example of FIG. 12, this linked list of consumers comprises application data block 1330, partition (i.e. sub-partition) data block 1332, and application data block 1334. It will be apparent that any arbitrary grouping of application data blocks and/or partition data blocks may be linked together using the present invention. Each of these consumer data blocks are linked together using next block pointers and previous block pointers. For example, next block pointer 1336 of application data block 1330 points to partition data block 1332, the next lower consumer data block in the linked list. Similarly, next block pointer 1340 of partition data block 1332 points to application data block 1334, the next lower consumer data block in the linked list. Next block pointer 1344 of application data block 1334 is set to a null value, because application data block 1334 is the last data block in the linked list. Because the preferred embodiment of the present invention employs doubly linked lists, each data block includes a backward pointer called a "previous block pointer." For example, previous block pointer 1346 of application data block 1334 points to partition data block 1332, which is the next higher consumer data block in the linked list. Similarly, previous block pointer 1342 of partition data block 1332 points to application data block 1330, which is the next higher consumer data block in the linked list. In this manner, each of the consumer data blocks in the linked list are linked, both in the forward and backward directions using next block pointers and previous block pointers as shown in FIG. 12.

Each of the consumer data blocks in the linked list of consumers contains a parent layer pointer that references back to the layer in which the consumer or consumers are executing. For example, parent layer pointer 1348 of application data block 1330, parent layer pointer 1350 of partition data block 1332, and parent layer pointer 1352 of application data block 1334 all reference back to layer 1312, which contains the consumer pointer 1326 that references the first consumer (application data block 1330) in this linked list of consumers.

In a similar manner, consumer data blocks contain a child layer pointer that references a lower level list of layers. For example, partition data block 1332 contains child layer pointer 1354, which references layer 1360 in a manner similar to the link provided by child layer pointer 1311 of partition 1310, which references layer 1312. In this manner, subpartitions, such as partition data block 1332, may reference lower level layers which, in turn, may reference an additional set of lower level consumers. In the preferred embodiment, although application data blocks contain a child layer pointer, applications are not allowed to reference lower level layers. Thus, child layer 1356 of application data block 1330 and child layer pointer 1358 of application data block 1334 contain null values. In this implementation, applications represent terminal elements in a tree of partitions, layers and applications. Note that the tree of objects shown in FIG. 12 is recursive. A partition points to a list of layers, a layer points to a list of consumers, and a consumer may, itself, be a partition having other layers.

Two hash tables provide a quick look-up mechanism for locating partitions and applications within a hierarchical structure of partitions, applications, and layers. The process group of an application is hashed to locate the corresponding application data block. For a partition, the inode field of a directory structure in the computer file system is hashed to locate the corresponding partition data block. To allow for hash collisions, each element of the hash table points to a hash bucket with room for a predetermined number of entries. If the hash bucket is full, additional buckets are arranged in a linked list. Hashing and the use of hash buckets is well known in the art.

Once partition or application data structures are located from the hash table, back pointers (i.e., parent layer pointers) can be used to locate the layer which contains them. A back pointer in the layer structure (i.e., the partition pointer) allows the partition which contains the layer to be located.

Partitions, being a description of a logical execution environment for application programs, may be stored separately from the allocator and scheduler component 710. In the preferred embodiment, partitions are maintained in a file system directory hierarchy, where each directory corresponds to a partition. The storage of partitions in a file system works particularly well with the Unix operating system, however, file systems in other computer systems may also be used for the storage of partitions. In Unix, the use of the file system to hold objects (i.e. partitions) other than files and directories is similar to the use of the /proc/ facility of the conventional Unix System V release 4. In Unix, an inode number of a directory is used as a unique identifier for the partition when requests are made to the allocator portion of the allocator and scheduler 710. A file in the directory of each partition contains information including the identity of nodes that are allocated to the partition, the scheduling attributes of the partition, the protection attributes of the partition, and other information about the partition. Most of this information is a shadow (i.e. copy) of the information maintained in the allocator and scheduler 710 data structures. This information includes the logical to physical node map 730, node bit map 732, and partition data 734. Maintaining partition information externally to the allocator and scheduler 710 allows much of the work of allocating nodes to be done before a request is made to the allocator, thereby reducing the demand on a single allocator task. By maintaining partition information in the file system of the computer system, a partition hierarchy may be recreated after a system reboot or crash.

Another advantage of maintaining partitions in a Unix file system is the ability to nest partitions within other partitions, thereby creating a partition hierarchy. In this manner, partitions may contain sub-partitions which, themselves, may contain sub-partitions to form a partition hierarchy that can be nested to an arbitrarily deep level. The method of scheduling used in the present invention preserves the fact that, despite the hierarchy of partitions, only one application program is active at a time on any one node and an entire application is active at once across all of the nodes on which it is loaded. The nesting of partitions into sub-partitions was described above in more detail in connection with FIG. 12.

Another advantage of storing partitions in a Unix file system, or other file system, is the ability to use access modes provided by the file system. For example, the Unix file system provides at least three levels of access. First, a partition stored in a file system may be set to enable or disable a Read Access mode. The read access mode allows or disallows access to information about the partition. For example, the number of nodes in the partition and the physical node numbers may be selectively accessible. The second access mode provided by the Unix file system with relation to partitions is a Write Access mode. The Write Access mode is used to enable or disable the ability to change the attributes of (i.e. information stored in) a partition. Thus, modifications to a partition may be enabled or disabled. The third access mode provided by the file system of the present invention is the Execute access mode. This third access mode allows or disallows the ability to run application programs from a partition and to create or remove sub-partitions from a partition.

In the present invention, tasks are scheduled using two types of scheduling: interactive scheduling or gang scheduling. Interactive scheduling is the same basic model used in the Unix operating system. In Unix, tasks or processes run for a short time slice (typically one-tenth of a second) or until they do a blocking system call, at which time the processes are rescheduled by the task scheduler. Interactive scheduling using Unix, or other operating systems in a single processor environment, is well known to those of ordinary skill in the art.

In a gang scheduling model, all of the tasks corresponding to a particular application program are scheduled (i.e. made active) at once all of the nodes on which tasks of the application program are loaded. In this manner, message passing between tasks of an application and thus between nodes of the multicomputer is more efficient. Message passing is more efficient because a message sender does not need to wait for a message receiver to become active (i.e. currently executing). In a gang scheduling mode, tasks of one or more application programs are arranged in a partition such that only one application program at a time is active on any one node and an entire application program is scheduled at once across all of the nodes on which the application is loaded.

The application programs contained within a partition may overlap. For example, more than one application program may be loaded on a single node. In addition, an application program may overlap with sub-partitions, which themselves contain application programs. In a gang scheduled partition, however, only one application program is activated at a time on any one node. These scheduling constraints are overcome by arranging application programs and sub-partitions into a series of tiled layers and scheduling each layer at once across a partition. Note that "tiled" does not imply that the nodes of an application program or subpartition must be physically contiguous.

Layers serve as the basis for scheduling in the present invention. Layers are created by the allocator and scheduler 712 when a new application program is initialized. After each activation quantum, the currently executing layer and the application programs and sub-partitions of the layer are inactivated and the next layer is scheduled. Any application programs in the layer are simply made active, however, sub-partitions must go through another round of scheduling (i.e. recursively activate the sub-partition). Scheduling proceeds recursively in sub-partitions until all of the application programs that will be run are identified and made active. By scheduling in this manner, only one application program at a time is active on any one node, and an entire application is active at once across all the nodes on which the application is loaded.

A subpartition will not be activated for a longer time period than its parent partition's activation quantum. If a subpartition has a larger time quantum than its parent partition, it will take more time than one actual activation period to satisfy the sub-partition's actual activation quantum.

Referring again to FIG. 7, the data structures of allocator and scheduler 710 have been described above. Specifically, these data structures include logical to physical node map 730, node bit map 732, partition data 734, application data 736, and layer data 738. In addition, the means and methods used in the present invention for creating linked lists of partitions, applications and layers is described above. As illustrated in FIG. 7, allocator and scheduler 710 also includes processing logic for implementing the allocation and scheduling operations provided by the task scheduler of the present invention. This processing logic includes allocator procedures and scheduler procedures. Processing logic for these procedures is described in the sections that follow.

Referring now to FIGS. 13 through 26, flow charts illustrate the processing logic used in the allocator and task scheduler of the present invention. As described above in connection with FIG. 7, allocator and scheduler 710 includes allocator procedures and scheduler procedures. The allocator procedures include a Make Partition procedure 720, an Initialize Application procedure 722, a Remove Partition procedure 724, a Remove Application procedure 726, and a Task Server Loop 728. The scheduler procedures include a Schedule Partition procedure 740, a Roll Out Partition procedure 742, and a Roll In Partition procedure 744. These allocator and scheduler procedures are described in the flow charts of FIGS. 13–26.

The processing logic of the present invention executes on a processor of the multicomputer used in the preferred embodiment. It will be apparent to those skilled in the art conventional means exist for loading and initiating the execution of processing logic in a processor. It will also be apparent to those skilled in the art that means exist for suspending or continuing the execution of a specified process.

Figure 13:
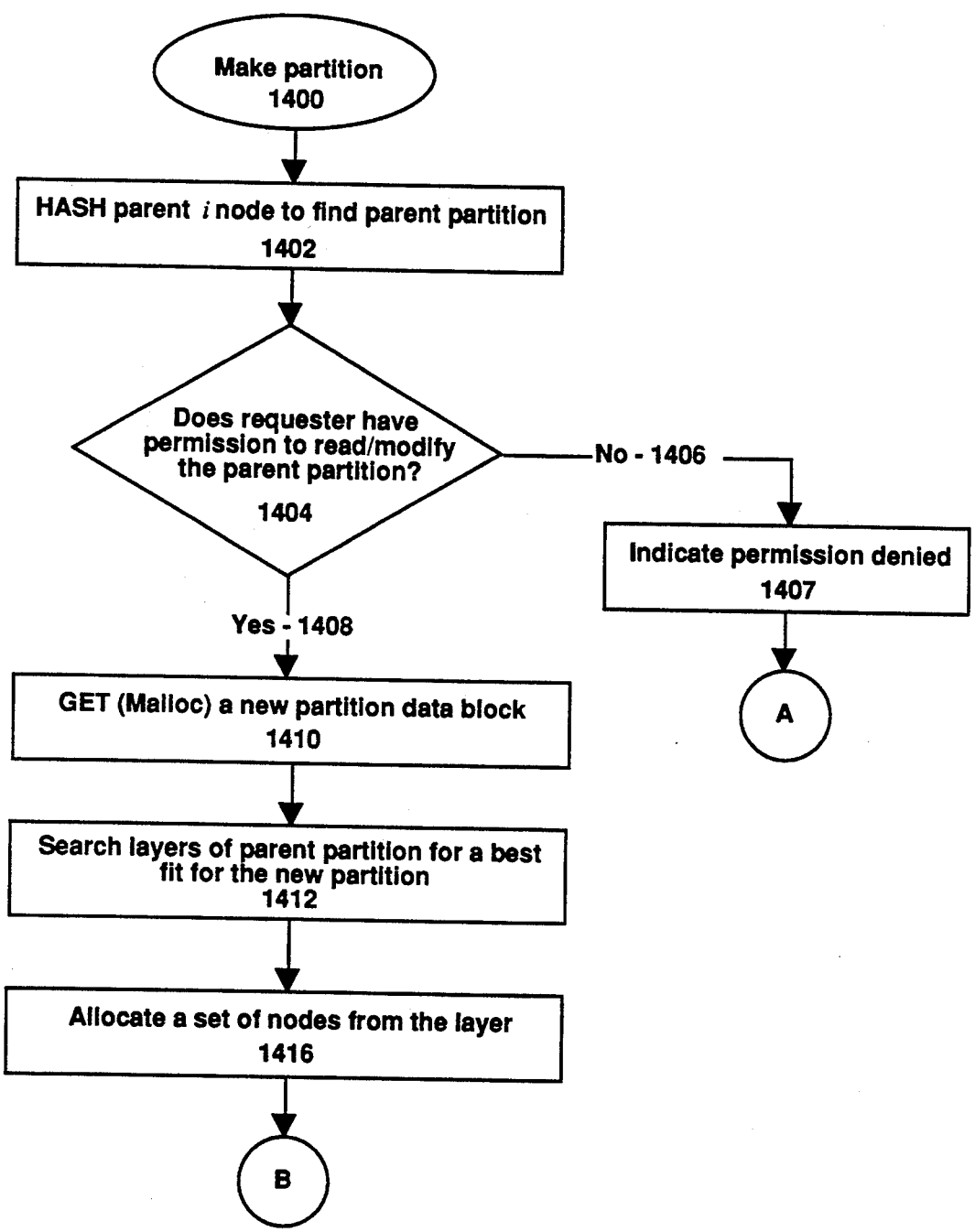
FIG. 13–26 are flowcharts illustrating the processing logic of the preferred embodiment.

Referring now to FIG. 13, the processing logic of the Make Partition procedure 1400 is illustrated. The Make Partition procedure is provided as a service to users or other portions of the operating system of the multicomputer. The Make Partition procedure is used to create sub-partitions within a partition conditional upon the access permission of the parent partition and the availability of the nodes. In formulating a call to the Make Partition procedure, a requester (i.e. a user or another operating system function) provides as input the inode or other identifier of the partition in which the newly created sub-partition will reside and the inode of the partition to be created. Also provided as input to the Make Partition procedure is a specification of the size of the partition or a specific request for a specified set of nodes. Upon activation of the Make Partition procedure, processing execution begins at the bubble labeled make partition 1400 illustrated in FIG. 13. In processing block 1402, the input inode or partition identifier is used to find the parent partition. In the preferred embodiment, the inode is used as an index into a hash table through which the parent partition may be located in processing block 1402. Having located the parent partition, the parent partition data block is opened and protection field 928 is accessed. In decision block 1404, the protection field of the parent partition is compared with the authorization attributes of the requester process. If the requester has permission to read or modify the parent partition, processing path 1408 is taken to processing block 1410. If the requester does not have sufficient permission to read or modify the parent partition, processing path 1406 is taken to processing block 1407 where the requester is notified of the access denial and processing terminates at the bubble labeled A illustrated in FIG. 14. If the requester has permission, a new partition data block is retrieved in processing block 1410. Such a new partition data block may be retrieved using conventional methods for retrieving a free memory block such as the memory allocation (MALLOC) function provided by the Unix operating system. The child layer pointer 936 of the parent partition is followed to a list of layers associated with the parent partition. Using the input size requested for the new partition, the layers of the parent partition are searched to find a best fit for the new partition in processing block 1412. Layer information in the newly obtained partition data block is updated with information pertaining to the layer found in processing block 1412. Having found the best fit layer for the new partition, a set of nodes from the layer is allocated in processing block 1416. Processing then continues at the bubble labeled B illustrated in FIG. 14.

Figure 14:
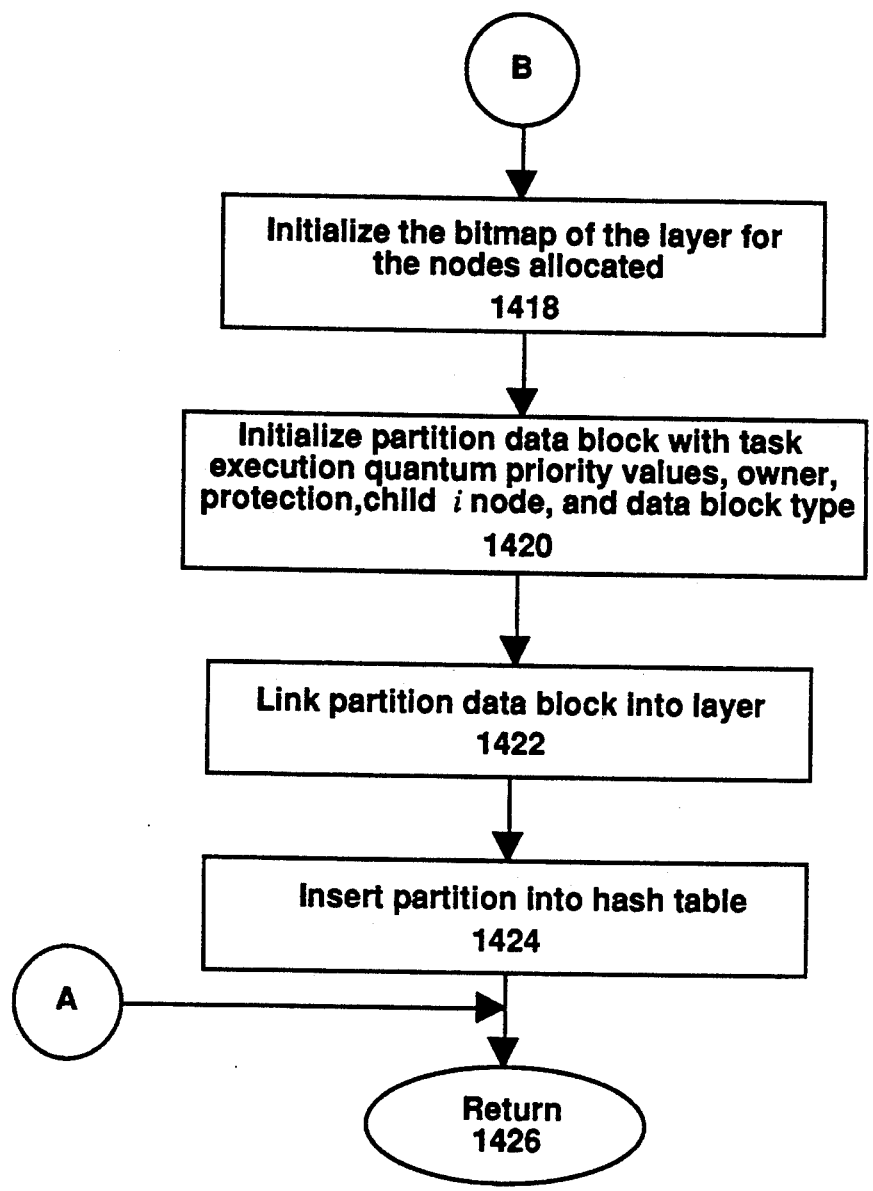

Referring now to FIG. 14, processing for the Make Partition procedure continues at the bubble labeled B. Having allocated a set of nodes from the layer in which the new partition will be located, the bit map of the layer is initialized to reflect the newly allocated nodes for the new partition in processing block 1418. Other parameters of the new partition are initialized in processing block 1420. For example, the new partition data block is updated with the partition execution quantum 924, the owner 926 of the new partition, the protection value 928 of the new partition, the inode 922 of the new partition, and the data block type 916 of the new partition. The new partition is linked into the layer by modifying next block pointer 930, previous block pointer 932, and parent layer pointer 934 in processing block 1422. Child layer pointer 936 is initially set to a null value for a new sub-partition. The newly created partition is inserted into the hash table in processing block 1424 by inserting the inode of the newly created partition into the hash table. Processing for the Make Partition procedure terminates with a return at processing bubble 1426.

Figure 15:
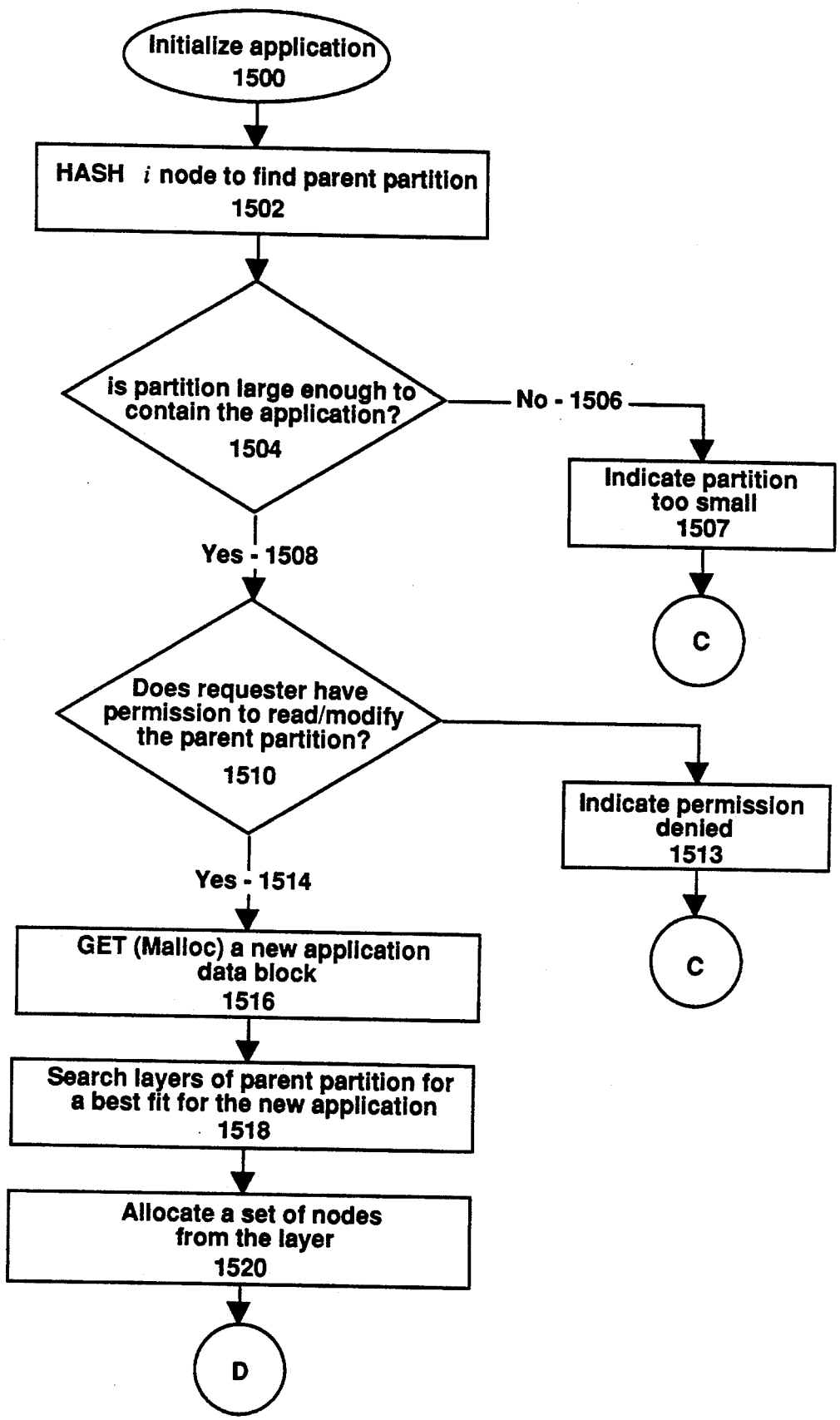

Referring now to FIG. 15, the processing logic for the Initialize Application procedure 722 is illustrated. In a manner similar to the Make Partition procedure, the Initialize Application procedure is initiated by a user or another operating system function. The Initialize Application procedure is initiated with input parameters including an inode number for a parent partition identifier, a name or identity of an application to initialize, a process group ID for the application, and a priority level of the application. Upon activation, the Initialize Application procedure begins execution at the bubble labeled initialize application 1500 illustrated in FIG. 15.

The Initialize Application procedure hashes the inode number to find the parent partition in processing block 1502. Using the input application name or identity, the size of the application may be obtained. The size of the application corresponds to the number of nodes necessary to execute the application. If the parent partition has enough nodes to contain the application, processing path 1508 is taken as illustrated in FIG. 15. If, however, the partition is not large enough to contain the application, processing path 1506 is taken to processing block 1507 where the requester is notified that the partition corresponding to the input inode is not large enough to contain the requested application (processing block 1507). Processing then terminates for the Initialize Application procedure at the bubble labeled C as illustrated in FIG. 16.

Referring again to FIG. 15 at decision block 1510, the access authorization of the requester is checked against the protection attributes of the parent partition. If the requester has permission to read or modify the parent partition, processing path 1514 is taken to processing block 1516. If, however, the requester does not have permission to read or modify the parent partition, processing path 1512 is taken to processing block 1513 where the requester is notified that permission to access the parent partition is denied. Processing then terminates for the Initialize Application procedure at the bubble labeled C illustrated in FIG. 16.

Referring again to FIG. 15, at processing block 1516, processing continues for the initialize application request. At processing block 1516, a new application data block is obtained. Conventional methods exist for obtaining a free memory block from the operating system. For example, the Unix operating system provides a memory allocation (MALLOC) function for obtaining a free block of memory. The child layer pointer 936 of the parent partition is followed to the list of available layers for the partition. The list of layers for the partition is searched for a layer having a set of nodes large enough to contain the application (processing block 1518). A set of nodes from the layer is allocated to the application in processing block 1520. Processing then continues at the bubble labeled D as illustrated in FIG. 16.

Figure 16:
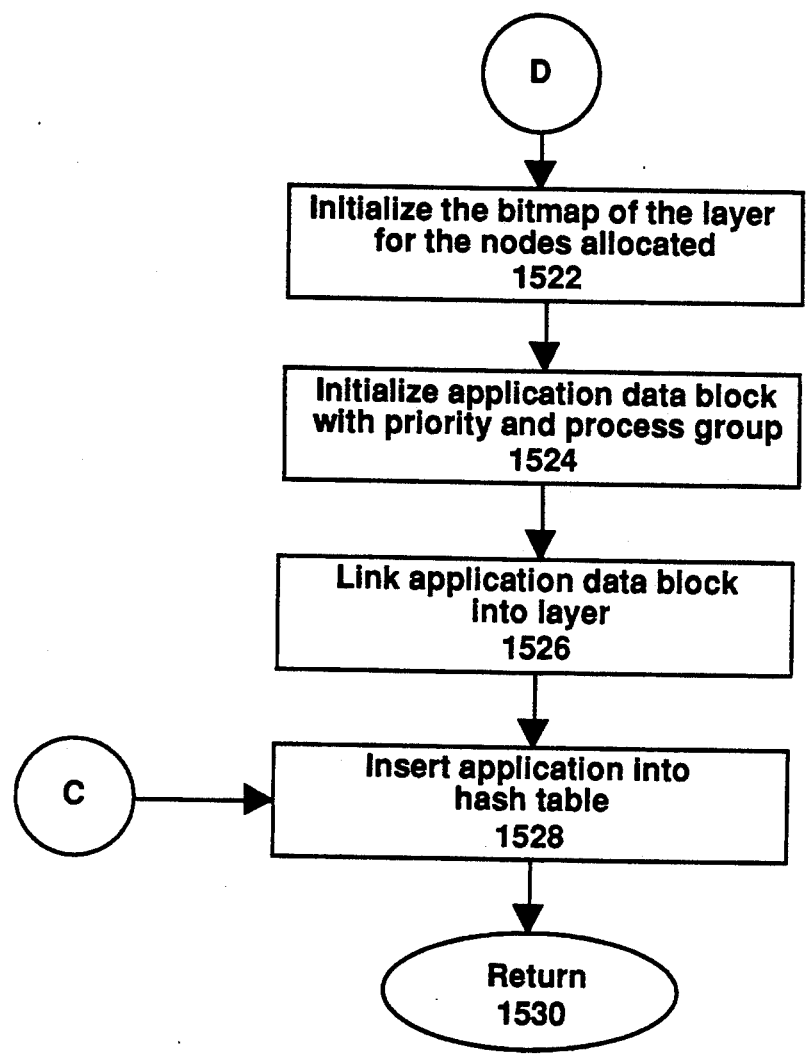

Referring now to the bubble labeled D as illustrated in FIG. 16, processing for the Initialize Application procedure continues at processing block 1522. The node bit map 1012 of the newly obtained application data block is initialized with the nodes allocated from the layer of the parent partition (processing block 1522). The remaining data areas of the application data block are initialized in processing block 1524. For example, the priority 1018 and the process group 1020 are initialized with parameters input to the initialized with parameters input to the Initialize Application procedure. Once the parameters of the application data block are initialized, the application data block is linked into the partition layer in processing block 1526. The application data block is linked into the partition by loading next block pointer 1030, previous block pointer 1032, and parent layer pointer 1034. Child layer pointer 1036 of the application data block is set to a null value. Once the application is linked into the layer, the application is inserted into the hash table in processing block 1528. Processing for the Initialize Application procedure then terminates at the return in processing bubble 1530.

Figure 17:
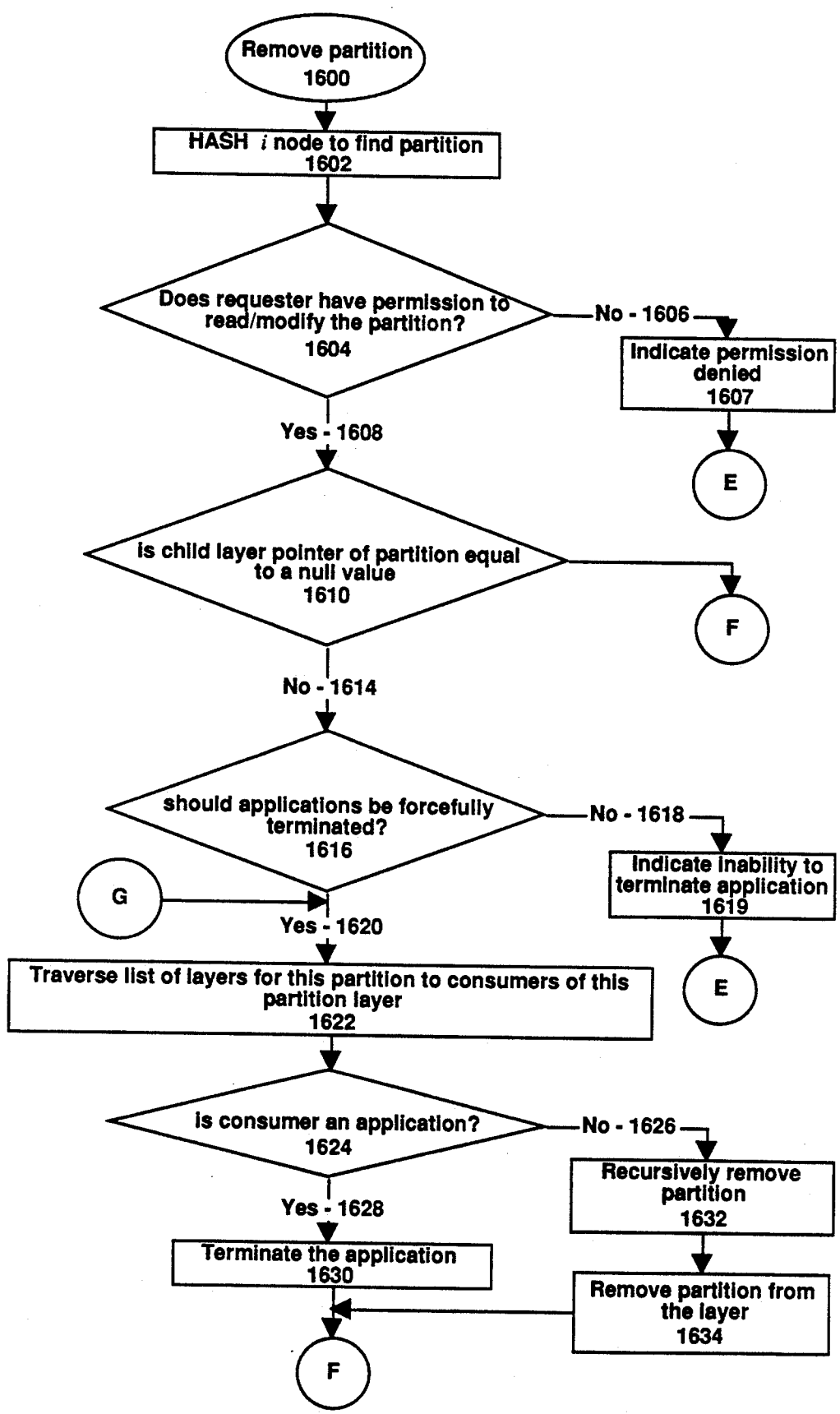

Referring now to FIG. 17, the processing logic for the Remove Partition procedure 724 is illustrated. The Remove Partition procedure is activated upon request from a user or another operating system function. Upon activation, the Remove Partition procedure processing logic begins at the bubble labeled remove partition 1600 illustrated in FIG. 17. At processing block 1602, the input inode or identity of the parent partition, is hashed to locate the parent partition. The access privileges of the requester are checked in decision block 1604. If the requester does not have permission to read or modify the parent partition, processing path 1606 is taken to processing block 1607 where the requester is notified that access to the parent partition has been denied. Processing then terminates at the bubble labeled E as illustrated in FIG. 18.

If the requester has permission to read or modify the parent partition, processing path 1608 is taken to decision block 1610. If the child layer pointer 936 of the partition to be removed is a null value, processing path 1612 is taken to the bubble labeled F illustrated in FIG. 18 and described below. If, however, the child layer pointer of the partition to be removed is not a null value, processing path 1614 is taken to decision block 1616. In this case, the partition to be removed has one or more layers associated with it that may contain applications or sub-partitions. If the applications within the layers of the partition to be removed may be forcefully terminated, processing path 1620 is taken to processing block 1622. If, however, applications may not be forcefully terminated, processing path 1618 is taken to processing block 1619 wherein the requester is notified of the inability to terminate applications within the partition to be removed. Processing then continues at the bubble labeled E as illustrated in FIG. 18.

Referring again to processing block 1622 illustrated in FIG. 17, the processing continues for layers of a partition to be removed. For each layer of the partition to be removed, the consumer pointer 1136 is traversed to each of the consumers of the partition layer in processing block 1622. If the consumer of the current layer is an application, processing path 1628 is taken to processing block 1630 wherein the application is terminated using conventional techniques. If, however, the consumer of the current layer is not an application, processing path 1626 is taken to processing block 1632 where the sub-partition consumer is processed. In the preferred embodiment, the Remove Partition procedure is recursively called to remove the sub-partition within the current layer (processing block 1632). Once the sub-partition is removed, the partition is removed from the layer in processing block 1634 by initializing consumer pointer 1136 of the layer. Processing then continues at the bubble labeled F as illustrated in FIG. 18.

Figure 18:
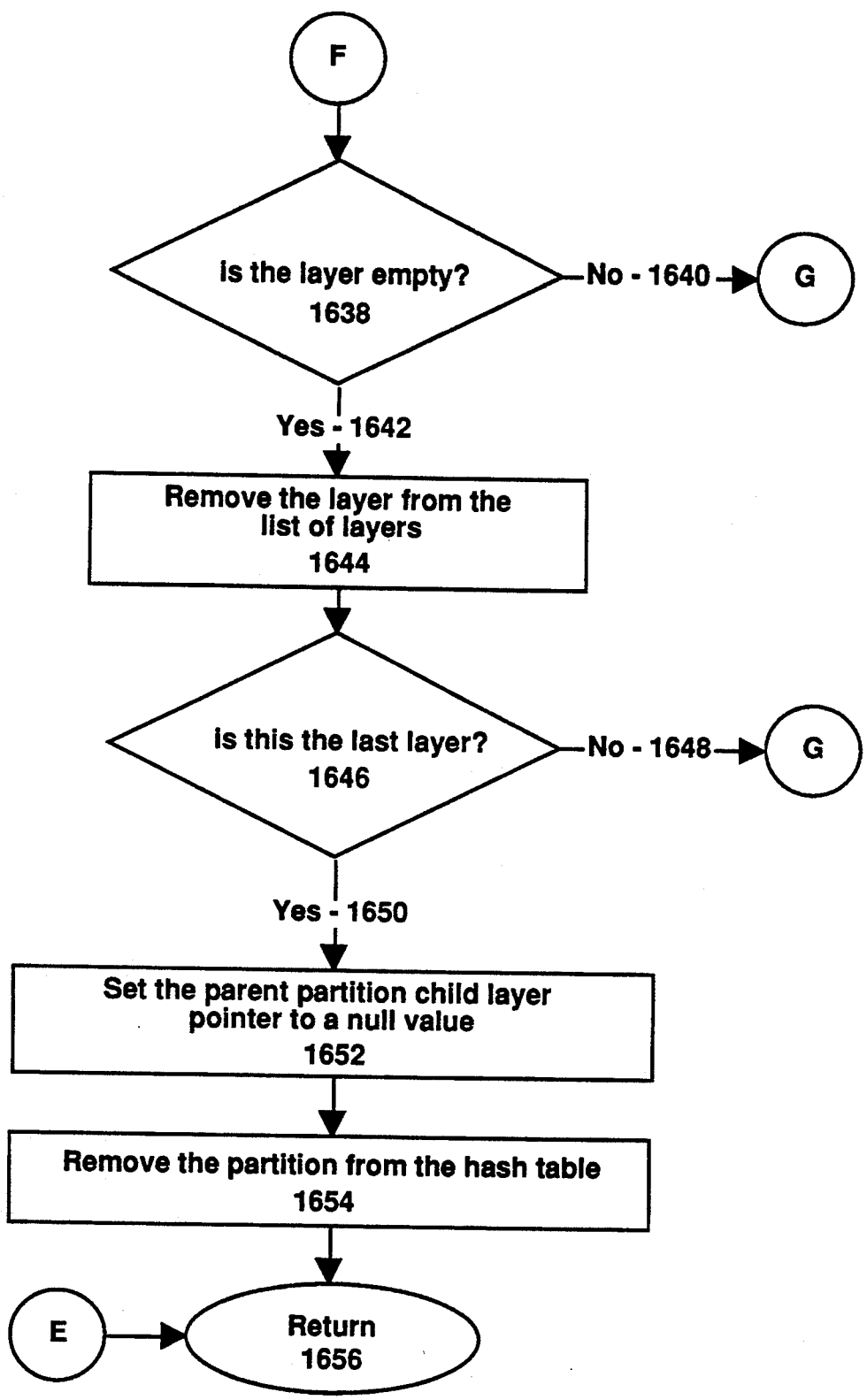

Referring now to FIG. 18, processing for the Remove Partition procedure continues at the bubble labeled F. At decision block 1638, the current layer is tested for additional consumers. If the current layer contained additional applications or sub-partitions, processing path 1640 is taken to the bubble labeled G illustrated in FIG. 17 where the next consumer application is terminated or consumer sub-partition is removed from the current layer. This loop continues until each of the consumers of the layer has been terminated or removed. Referring again to FIG. 18, once all of the consumers of the layer have been removed, processing path 1642 is taken to processing block 1644 where the layer is removed from the list of layers of the partition to be removed. The layer is removed from the partition by unlinking the layer from the list of layers (processing block 1644). If there are additional layers in the list of layers for the partition, processing path 1648 is taken to the bubble labeled G illustrated in FIG. 17 where the consumers of the next layer are terminated or removed. This process continues until each of the layers for the partition to be removed has been removed from the list of layers of the partition. Once this occurs, processing path 1650 is taken to processing block 1652 where the child layer pointer of the parent partition is set to a null value. The partition is then removed from the hash table in processing block 1654. Processing for the Remove Partition procedure then terminates at the return in processing bubble 1656.

Figure 19:
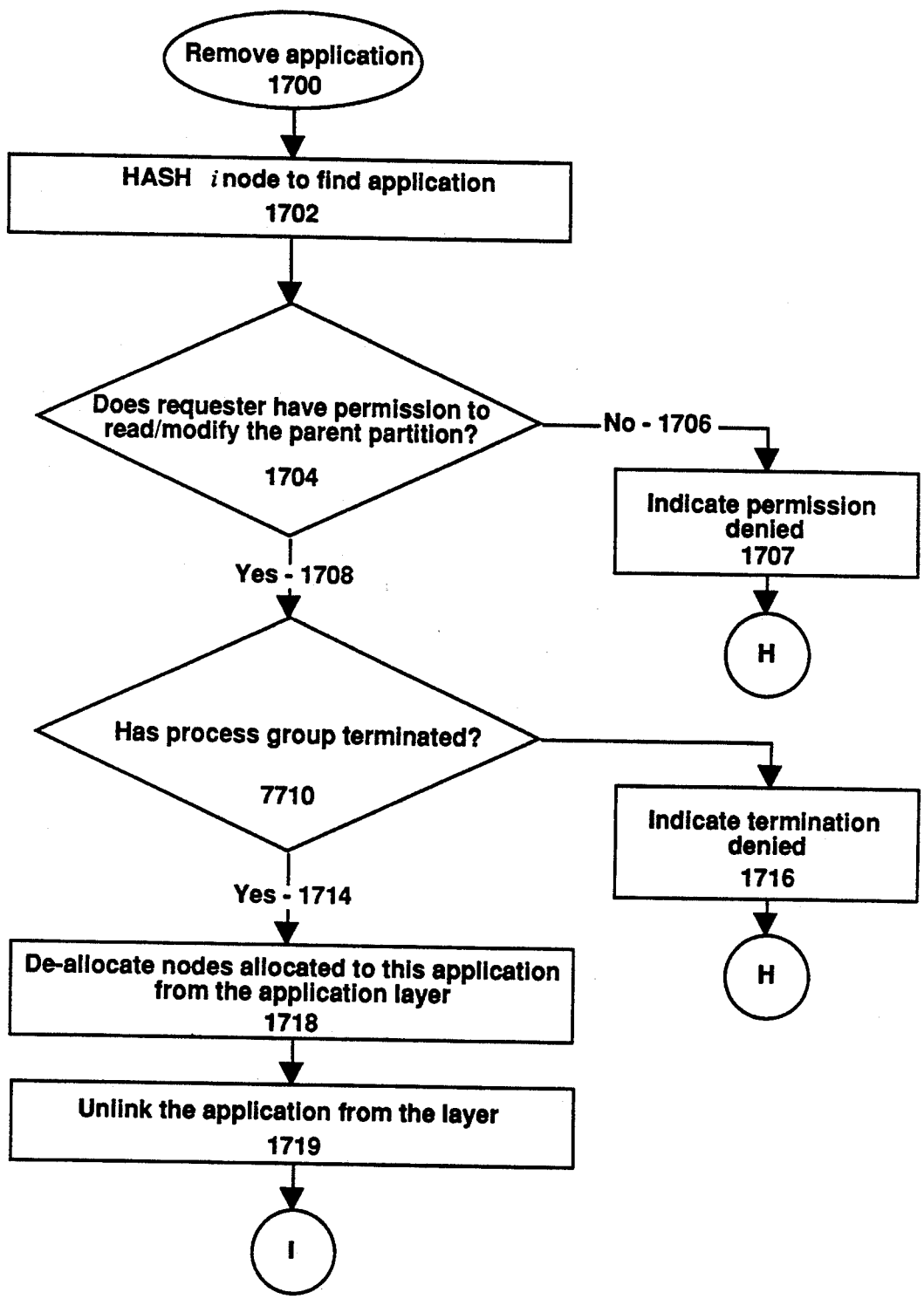

Referring now to FIG. 19, the processing logic for the Remove Application procedure is illustrated. The Remove Application procedure is initiated by a user or other operating system function for the purpose of removing an application from a layer of a partition. The inode or identity of the application is provided as input to the Remove Application procedure. Upon initiating the Remove Application procedure, the processing logic beginning at the bubble labeled remove application 1700 illustrated in FIG. 19 is executed. Upon execution of the Remove Application procedure, the input application inode is hashed to find the application data block (processing block 1702). The parent layer pointer 1034 of the application data block is followed to the layer in which the application resides. The partition pointer 1134 of the layer is followed to determine the parent partition of the application. If the requester does not have permission to read or modify the parent partition, processing path 1706 is taken to processing block 1707 where the requester is notified that access to the parent partition has been denied. Processing then continues at the bubble labeled H illustrated in FIG. 20 where processing for the Remove Application procedure terminates at the return of bubble 1738.

Figure 20:
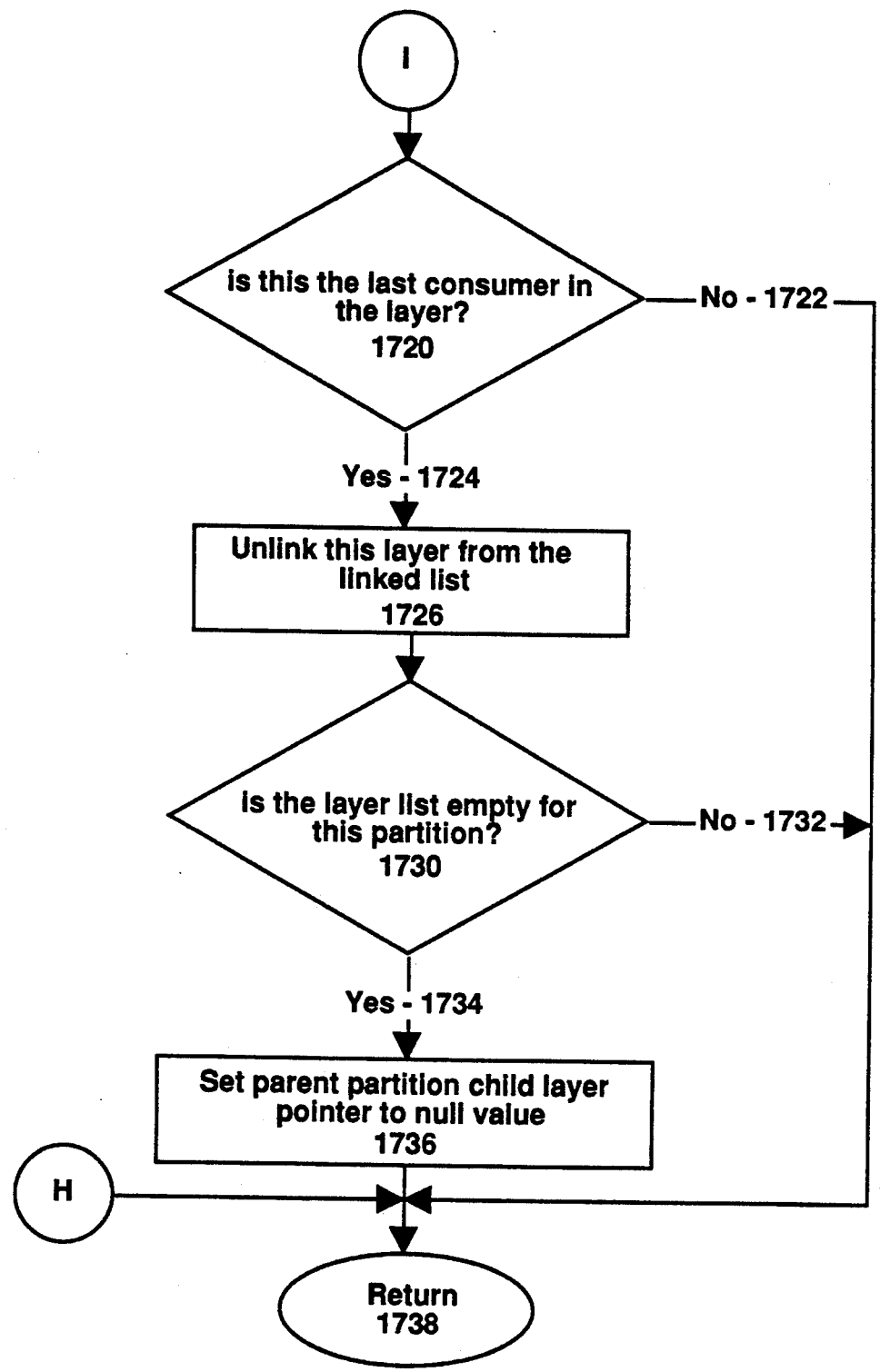

Referring again to decision block 1704, decision path 1708 is taken if the requester does have permission to read or modify the parent partition. In this case, the process group of the application for removal is tested in decision block 1710. Using conventional means, the status of a process group of which an application is a member may be tested. If the process group of the application for removal has not terminated, processing path 1712 is taken to processing block 1716 where the requester is notified that removal of the application cannot be accomplished because the corresponding processing group has not terminated. In this case, processing terminates at the bubble labeled H as illustrated in FIG. 20. If, however, the process group of the application has terminated, processing path 1714 is taken to processing block 1718. In processing block 1718, the nodes allocated to the application being removed are de-allocated from the layer in which the application resides (processing block 1718). Once the nodes of the application have been de-allocated from the layer, the application is unlinked from the layer in processing block 1719. Processing then continues at the bubble labeled I illustrated in FIG. 20.

Referring now to FIG. 20, processing logic for the Remove Application procedure continues at the bubble labeled I—the layer in which the removed application is checked to determine if other consumers exist in the layer. If no other consumers exist in the layer, processing path 1724 is taken to additional logic for removing the layer. If, however, the layer contains other consumers, processing path 1722 is taken and processing for the Remove Application procedure terminates at bubble 1738. If the removed application was the last consumer in the layer, processing path 1724 is taken to processing block 1726 where the layer is unlinked from the list of layers of the parent partition. If the unlinked layer was the last layer in the list of layers for this partition, processing path 1734 is taken to processing block 1736 where the child layer pointer of the parent partition is set to a null value. If, however, additional layers exist in the list of layers for the parent partition, processing path 1732 is taken, and processing for the Remove Application procedure terminates at the return of bubble 1738.

Figure 21:
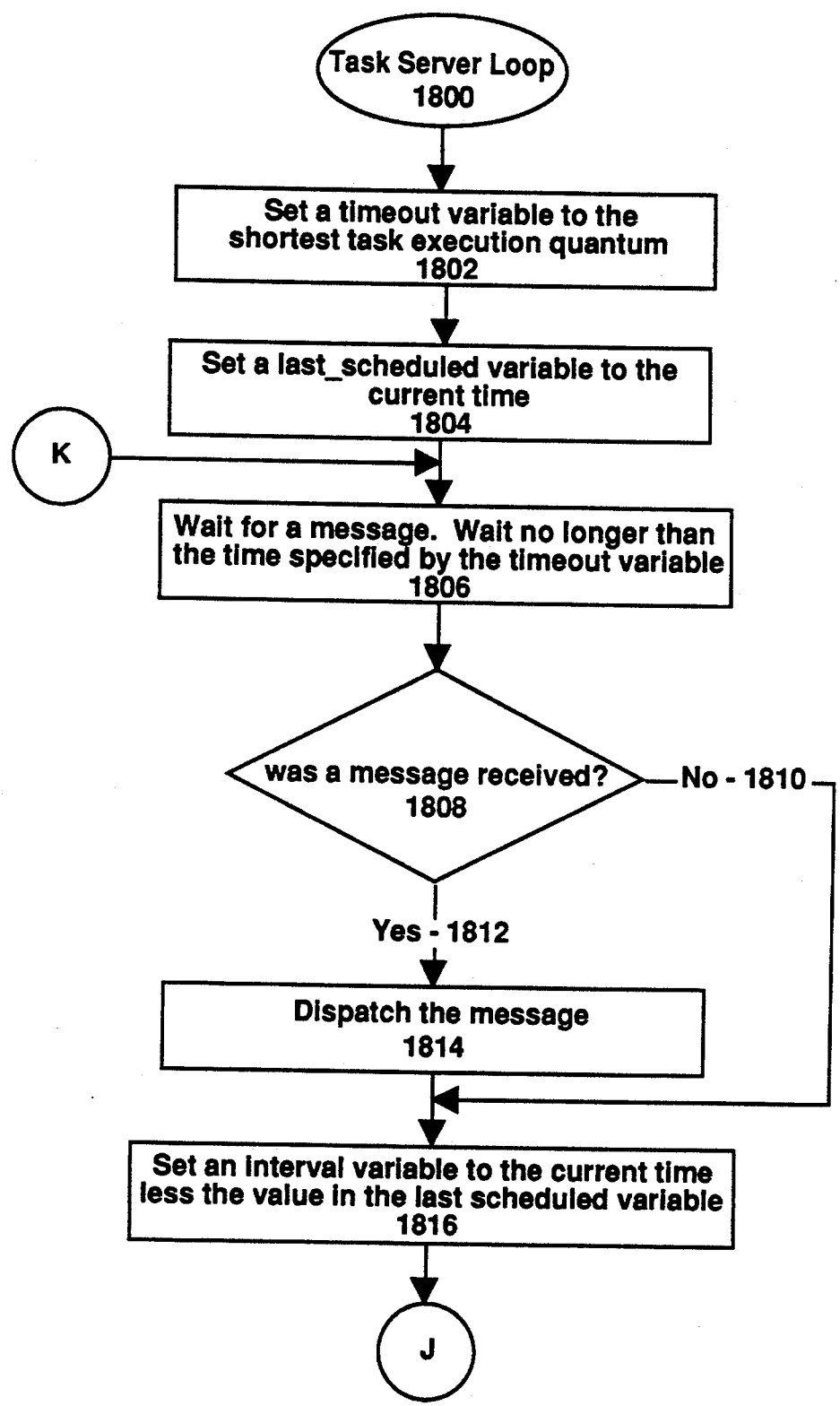

Referring now to FIG. 21, the processing logic of the Task Server Loop 728 is illustrated. The Task Server Loop 728 is an allocator procedure used for servicing messages from external processes and for performing roll in and roll out scheduling of application programs. Once initiated at the initialization of the operating system, processing for the Task Server Loop begins at the bubble labeled Task Server Loop 1800 illustrated in FIG. 21. The first operation performed by the Task Server Loop is to set a time out variable to a quantity corresponding to the shortest task execution quantum from any of the existing partitions (processing block 1802). Next, a Last_Scheduled variable is set to the current time in processing block 1804. The time out variable and the Last_Scheduled variable are used by the Task Server Loop to sequence the execution of layers of partitions. Starting at processing block 1806, the main loop of the Task Server Loop is entered. The Task Server Loop waits for a message from an external process in processing block 1806. The Task Server Loop will wait no longer than the time specified by the timeout variable previously loaded. If a message is received (processing path 1812) the message is dispatched to the appropriate process in processing block 1814. If, however, no message was received within the time out period, processing path 1810 is taken to processing block 1816 where an interval variable is set to the current time minus the value in the last scheduled variable. Processing continues for the Task Server Loop at the bubble labeled J illustrated in FIG. 22.

Figure 22:
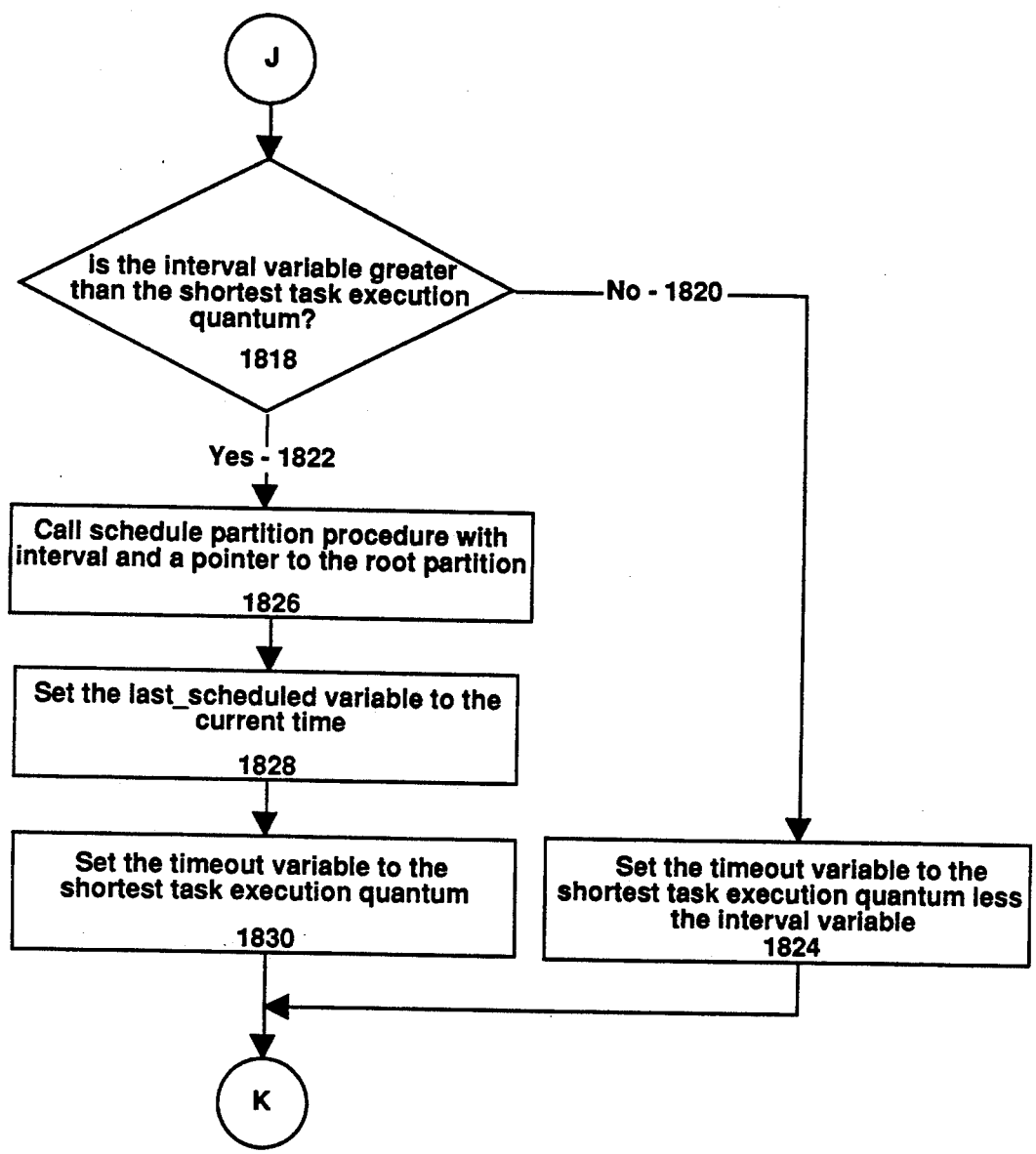

Referring now to FIG. 22, the processing for the Task Server Loop continues at the bubble labeled J. At decision block 1818, the contents of the interval variable are tested against the shortest task execution quantum. The test performed in decision block 1818 is used to determine if time has expired for the currently executing layer. If time has not expired, processing path 1820 is taken to processing block 1824 where the time out variable is updated to the shortest task execution quantum less the interval variable. Processing then returns to the top of the main loop at the bubble labeled K illustrated in FIG. 21 where the Task Server Loop again waits for a message from an external process (processing block 1806). Referring again to FIG. 22 at decision block 1818, if time has expired for the currently executing layer, processing path 1822 is taken to processing block 1826 where the Schedule Partition procedure of the present invention is activated. The Schedule Partition procedure is described in more detail in connection with FIGS. 23 and 24. The Schedule Partition procedure is activated with the interval time and a pointer to the route partition provided as input. The Schedule Partition procedure will scan through the specified partition and schedule a subsequent layer or sub-partition of the specified partition. Upon completion of the Schedule Partition procedure, the last scheduled variable is set to the current time in processing block 1828. The time out variable is set to the shortest task execution quantum in processing block 1830. Processing then continues at the top of the main loop at the bubble labeled K illustrated in FIG. 21. The Task Server Loop remains in the infinite main loop from the processing blocks below the bubble labeled K in FIG. 21 to the bubble labeled K illustrated in FIG. 22. Thus, the processing routines for the allocator of the present invention are illustrated.

Figure 23:
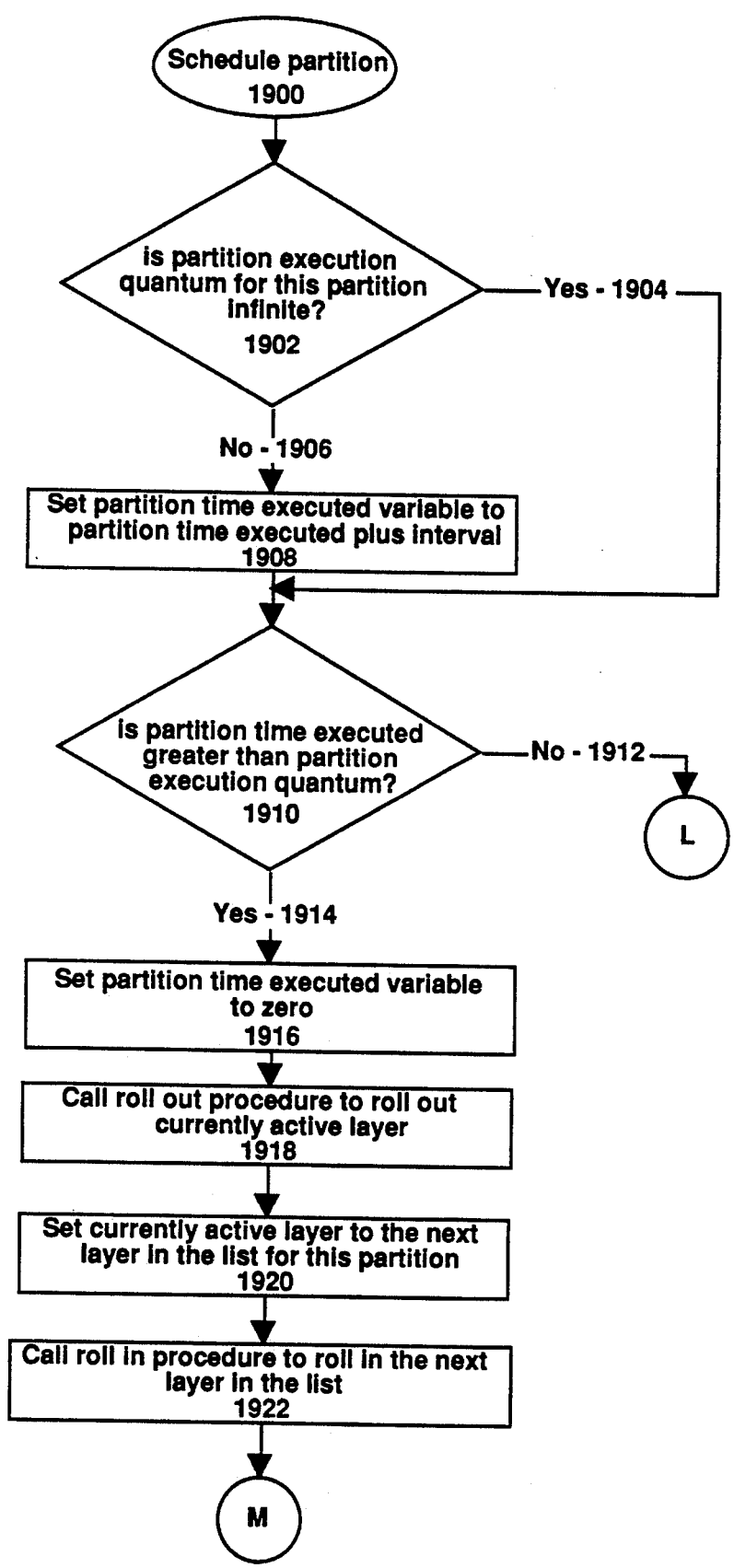

Referring now to FIGS. 23 through 26, the processing logic for the procedures of the scheduler are illustrated. Referring now to FIG. 23, the processing logic for the Schedule Partition procedure 740 is illustrated. The processing logic for the Schedule Partition procedure is activated by the Task Server Loop 728 of the allocator of the present invention. When the execution quantum for the currently executing layer has expired, the Schedule Partition procedure is responsible for scanning a specified partition for the next layer or sub-partition for execution. Upon activation of the Schedule Partition procedure, the processing logic starting at the bubble labeled schedule partition 1900 illustrated in FIG. 23 is executed. An inode or partition identifier is provided as input to the Schedule Partition procedure. If the partition execution quantum 924 of the specified partition is infinite, processing path 1904 is taken to bypass processing block 1908. If, however, the partition execution quantum 924 of the specified partition is not infinite, processing path 1906 is taken and processing block 1908 is executed. At processing block 1908, the partition time executed variable 925 of the specified partition is set to the current contents plus the interval time provided as input to the Schedule Partition procedure (processing block 1908). At decision block 1910, the time variables of the partition are checked to determine if time has expired for the currently executing layer. If this is the case, processing path 1914 is taken to processing block 1916. If, however, the partition time executed variable 925 is not greater than the partition execution quantum 924 of the partition, processing path 1912 is taken to the bubble labeled L illustrated in FIG. 24 and described below.

If execution time has expired for the currently executing layer, the partition time executed variable 925 is set to zero in processing block 1916. A roll out procedure is called to roll out the currently active layer in processing block 1918. The roll out procedure is described below in connection with FIG. 25. The roll out procedure is used to suspend execution of the currently active layer. Upon completion of the roll out procedure (processing block 1918), the currently active layer variable 929 is set to the next layer in the list for this partition in processing block 1920. The roll in procedure is then called in to roll in or begin execution of the next layer in the list (processing block 1922). The roll in procedure is described in detail below in connection with FIG. 26. The roll in procedure is used to initiate activation of the consumers in a layer. Upon completion of the roll in procedure for the next layer, processing for the Schedule Partition procedure terminates at the bubble labeled M illustrated in FIG. 24.

Figure 24:
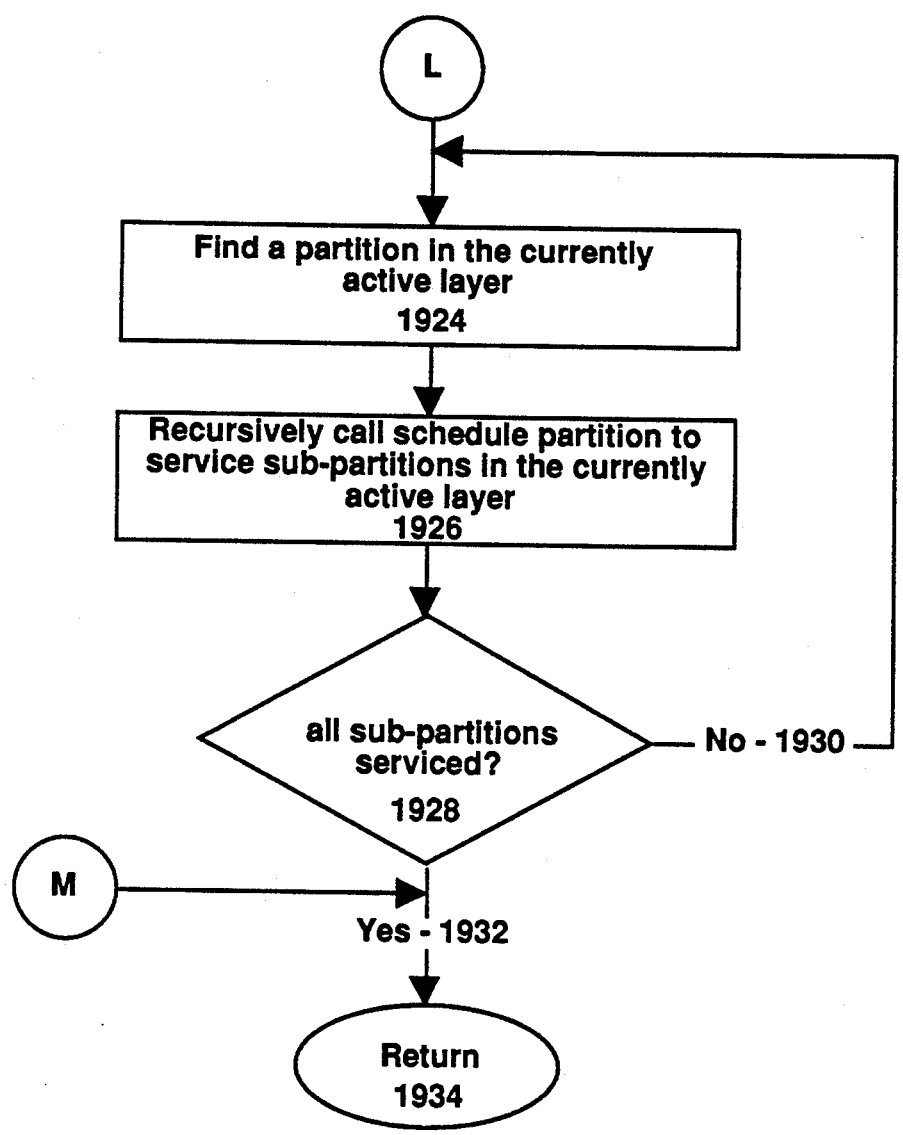

Referring again to decision block 1910, if execution time for the currently active layer has not expired, processing path 1912 is taken to the bubble labeled L as illustrated in FIG. 24. Referring now to FIG. 24, processing for the Schedule Partition procedure continues at the bubble labeled L. Processing logic beginning at the bubble labeled L is used to service the execution of sub-partitions of the currently active layer. The consumer pointer 1136 of the currently active layer is followed to determine if a partition exists in the currently active layer (processing block 1924). If a sub-partition exists in the currently active layer, the Schedule Partition procedure is recursively called to initiate execution of applications within sub-partitions of the currently active layer (processing block 1926). Upon completion of the scheduling for each of the sub-partitions of the currently active layer, processing path 1932 is taken and processing for the Schedule Partition procedure terminates at the bubble 1934. If, however, other sub-partitions exist in the currently active layer, processing path 1930 is taken back to the bubble labeled L illustrated in FIG. 24 where the next sub-partition of the currently active layer is serviced.

Figure 25:
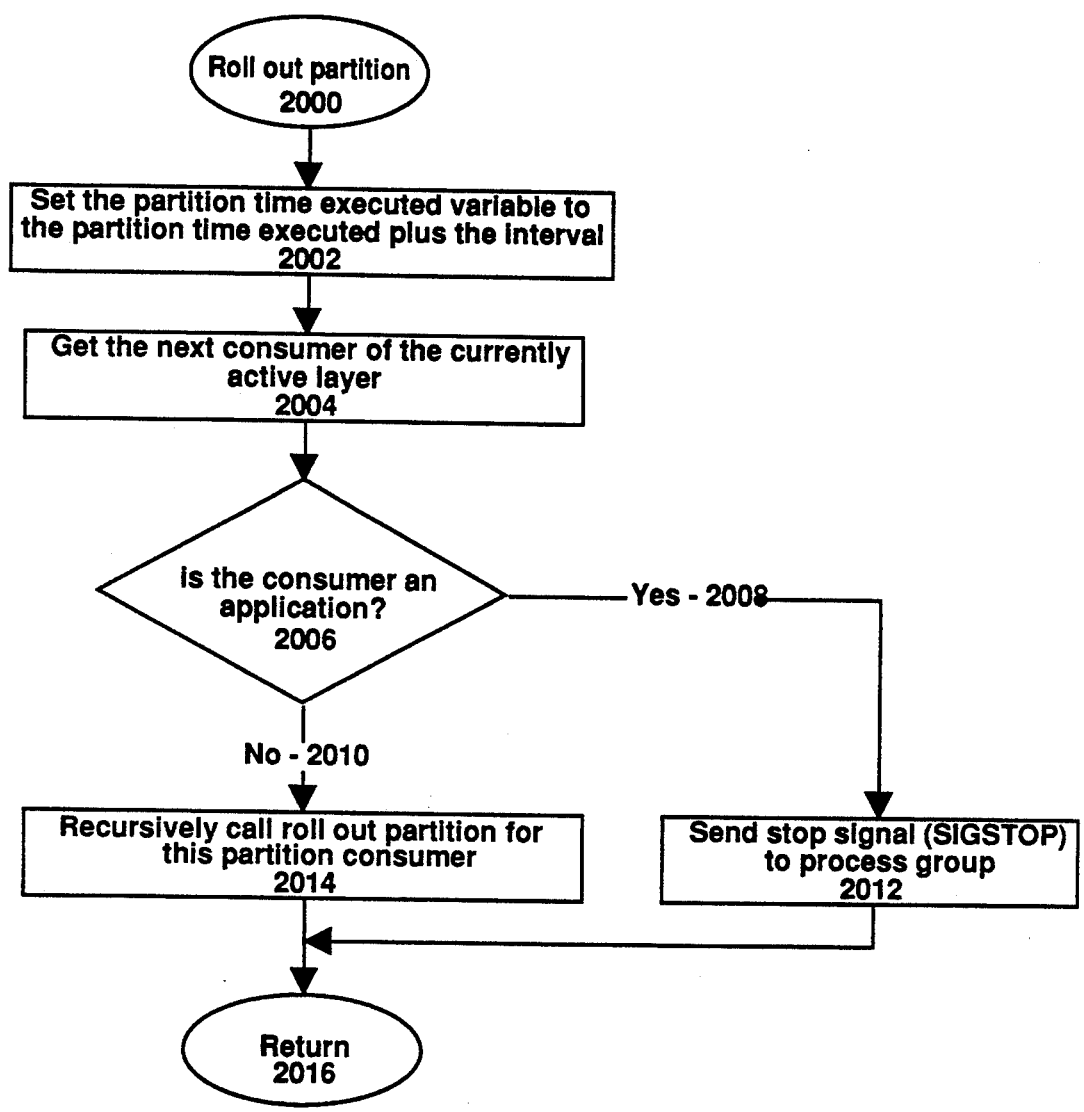

Referring now to FIG. 25, the Roll Out Partition procedure 742 of the scheduler is illustrated. The Roll Out Partition procedure is initiated by the Schedule Partition procedure 740 during the operation of the scheduler. Upon activation, the processing logic illustrated in FIG. 25 starting at the bubble labeled roll out partition 2000 is executed. An interval time and a partition identifier are provided as input to the Roll Out Partition procedure. Upon activation, the interval time is added to the value residing in the partition time executed variable 925 in processing block 2002. Next, the consumer pointer 1136 of the currently active layer is followed to obtain the next consumer of the currently active layer in processing block 2004. If the consumer so obtained is an application, processing path 2008 is taken to processing block 2012. At processing block 2012, a stop signal (SIGSTOP) is sent to the process group in which the application resides. The use of a stop signal (SIGSTOP) for terminating the execution of a process group is well known in the art. Having stopped execution of the consumer application, processing for the Roll Out Partition procedure terminates at the bubble labeled 2016. Referring again to decision block 2006, if the consumer obtained from the currently active layer is not an application, processing path 2010 is taken to processing block 2014 where the Roll Out Partition procedure is recursively called to suspend execution for layers of a sub-partition of the parent partition. This recursive call to the Roll Out Partition procedure will continue until each of the applications in the currently active layer or in sub-partitions of the currently active layer are stopped. When this has occurred, processing for the Roll Out Partition procedure terminates at the bubble labeled 2016.

Figure 26:
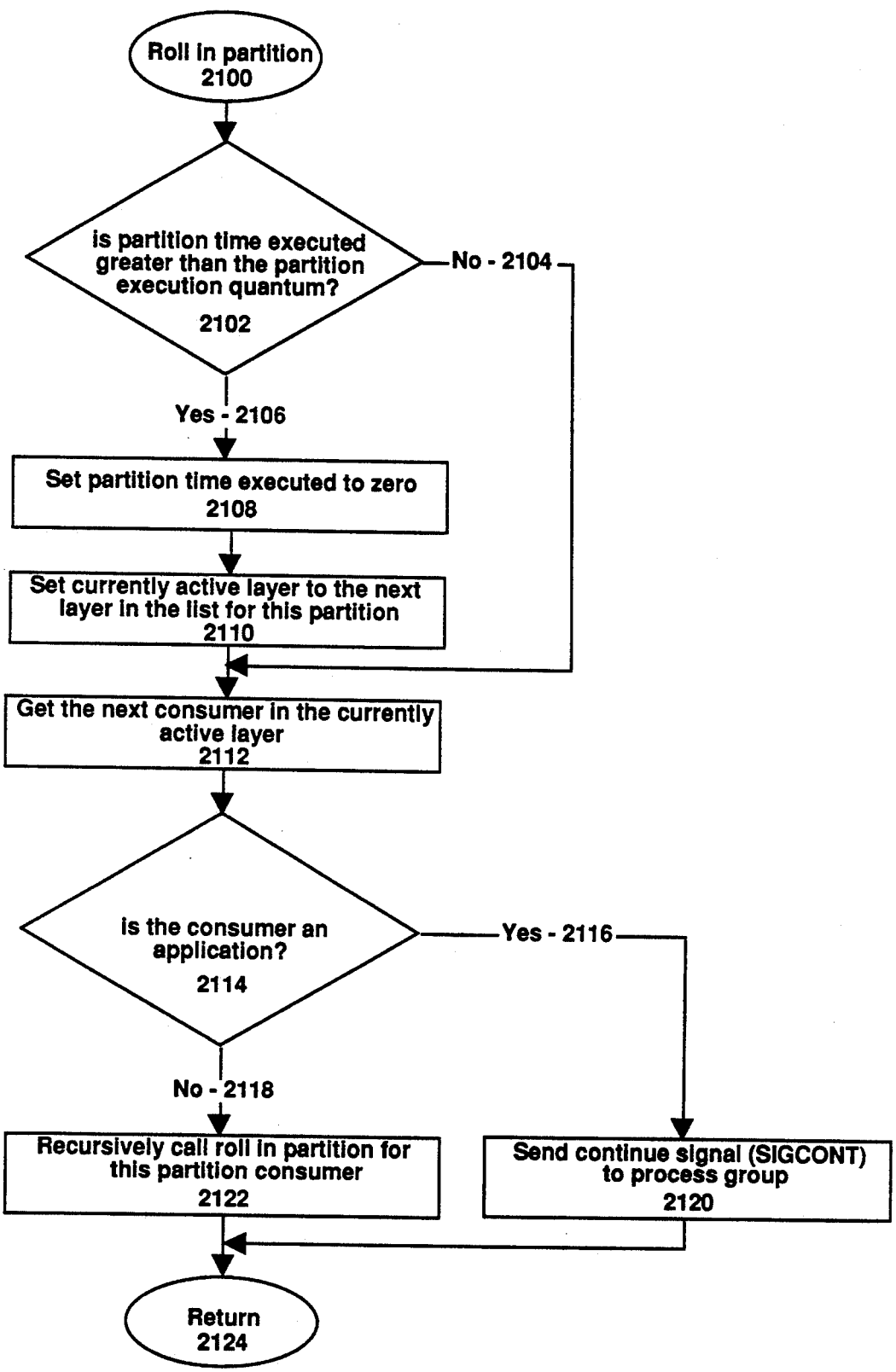

Referring now to FIG. 26, the processing logic for the Roll In Partition procedure of the scheduler is illustrated. The Roll In Partition procedure is activated by the Schedule Partition procedure 740 of the scheduler. Upon activation, the processing logic illustrated in FIG. 26 beginning at the bubble labeled roll in partition 2100 is executed. An interval time and a partition identifier are provided as input to the Roll In Partition procedure. Starting at decision block 2102, a test is performed to determine if the time has expired for the currently executing layer. If this is the case, the partition time executed variable 925 is initialized to zero in processing block 2108. The currently active layer parameter 929 of the partition is set to the next layer in the list for the partition in processing block 2110. Referring back to decision block 2102, if time has not expired for the currently executing layer, processing path 2104 is taken to bypass the processing in processing blocks 2108 and 2110. In this case, the same currently active layer remains executing. At processing block 2112, the next consumer in the currently active layer is obtained by traversing consumer pointer 1136. If the consumer so obtained is an application, processing path 2116 is taken to processing block 2120 where a continue signal (SIGCONT) is sent to the process group of which the consumer application is a member. Means for triggering execution of a process group using a continue signal is well known in the art. Once execution of the application is continued (processing block 2120), processing for the Roll In Partition procedure terminates at bubble 2124. Referring again to decision block 2114, if the consumer of the currently active layer is a sub-partition, processing path 2118 is taken to processing block 2122 where the Roll In Partition procedure is recursively called to trigger the continued execution of applications within sub-partitions of the currently active layer. This recursive call of the Roll In Partition procedure continues until each of the application consumers within the currently active layer or sub-partitions of the currently active layer are triggered to continue execution by sending a continue signal (SIGCONT) to each of the applications. Processing for the Roll In Partition procedure then terminates at the bubble 2124.

Thus, an improved task scheduler for a multicomputer is described.

Although the present invention is described herein with reference to a specific embodiment, many modifications and variations therein will readily occur to those skilled in the art. Accordingly, all such variations and modifications are included within the intended scope of the present invention as defined by the following claims.

APPENDIX

```
Partition structure PART_T
typedef struct part {
        (LIST_T*)       prev;
        (LIST_T*)       next;
        int             type;
        (LAYER_T*)      parent_lyr;
        (BITMAP_T*)     bm;
        (LP_MAP_T*)     lp;
        int             cur_priority;
        int             max_priority;
        ino_t           inode;
        long            rollin_quantum;
        long            rolled_in_time;
        uid_t           owner;
        gid_t           group;
        int             protection;
        (LAYER_T*)      active_lyr;
        (LAYER_T*)      child_lyr;
}       APPL_T;
Application structure APPL_T
typedef struct appl {
        (LIST_T*)       prev;
        (LIST_T*)       next;
        int             type;
```

APPENDIX -continued

```
        (LAYER_T*)      parent_lyr;
        (BITMAP_T*)     bm;
        (LP_MAP_T*)     lp;
        int             priority;
        gid_t           pgroup;
        long            roll_in_time;
}       APPL_T;
Layer structure LAYER_T
typedef struct layer {
        (struct layer *) prev;
        (struct layer *) next;
        (PART_T*)       part;
        (BITMAP_T*)     bm;
        int             priority;
        int             num_allocated;
        (LIST_T*)       consumer;
}       LAYER_T;
```

What is claimed is:

1. In a multicomputer having a plurality of processing nodes on which application programs are executed, each application program having one or more associated tasks, a process for controlling the execution of said tasks on said nodes, said process comprising the steps of:

creating logical partitions of said nodes, each of said partitions retaining information specifying which nodes are included in said partition, at least one node being included in one or more partitions, each of said partitions having a set of scheduling constraints;

assigning tasks of one or more of said application programs to said partitions, at least one partition containing tasks from a plurality of said application programs, all tasks of a particular application program contained within a same partition;

and executing all tasks of said partition concurrently for a length of time no longer than a predetermined activation time period.

2. The process as claimed in claim 1 wherein said assigning step further includes the steps of:

creating a logical layer of said nodes, said layer retaining information specifying which nodes are included in said layer, said layer having a partition pointer for linking said layer to said partition, said layer having a consumer pointer for linking said layer to a first one of a list of consumers of said layer, said consumers including said application programs or other sub-partitions of said layer;

linking said layer to said partition by manipulating said partition pointer; and linking one of said consumers to said layer by manipulating said consumer pointer.

3. The process as claimed in claim 2 wherein said sub-partitions of said layer are linked to other layers in a hierarchical structure.

4. The process as claimed in claim 2 wherein only one layer is scheduled at a time.

5. The process as claimed in claim 2 wherein for each node in said layer there is at most one consumer.

6. The process as claimed in claim 1 wherein said partition includes a partition priority level, said process further including a step of modifying said partition priority level to correspond to a task executing in said partition.

7. The process as claimed in claim 6 wherein said partition includes a maximum partition priority level, said step of modifying said partition priority level further including a step of limiting said partition priority level to a value no greater than said maximum partition priority level.

8. The process as claimed in claim 1 wherein said executing step further includes the step of executing said tasks of said application program using an interactive scheduling model.

9. The process as claimed in claim 1 wherein said executing step further includes the step of executing said tasks of said application program using a gang scheduling model.

10. The process as claimed in claim 1 wherein said executing step further includes a step of recursively scheduling tasks of said partition.

11. The process as claimed in claim 1 wherein said partition includes a time quantum for specifying a maximum length of time a task of said partition is executed in a single scheduling cycle.

12. In a multicomputer having a plurality of processing nodes on which application programs are executed, each application program having one or more associated tasks, a computer implemented task scheduler for controlling the execution of said tasks on said nodes, said task scheduler comprising:
   means for creating logical partitions of said nodes, each of said partitions retaining information specifying which nodes are included in said partition, at least one node being included in one or more partitions, each of said partitions having a set of scheduling constraints;
   means for assigning tasks of one or more of said application programs to said partitions, at least one partition containing tasks from a plurality of said application programs, all tasks of a particular application program contained within a same partition; and
   means for executing all tasks of said partition concurrently for a length of time no longer than a predetermined activation time period.

13. The task scheduler as claimed in claim 12 wherein said means for assigning further includes:
   means for creating a logical layer of said nodes, said layer retaining information specifying which nodes are included in said layer, said layer having a partition pointer for linking said layer to said partition, said layer having a consumer pointer for linking said layer to a first one of a list of consumers of said layer, said consumers including said application programs or other sub-partitions of said layer;
   means for linking said layer to said partition by manipulating said partition pointer; and
   means for linking one of said consumers to said layer by manipulating said consumer pointer.

14. The task scheduler as claimed in claim 13 further including means for linking said sub-partitions of said layer to other layers in a hierarchical structure.

15. The task scheduler as claimed in claim 13 wherein only one layer is scheduled at a time.

16. The task scheduler as claimed in claim 13 wherein for each node in said layer there is at most one consumer.

17. The task scheduler as claimed in claim 12 wherein said partition includes a partition priority level, said task scheduler further includes means for modifying said partition priority level to correspond to a task executing in said partition.

18. The task scheduler as claimed in claim 17 wherein said partition includes a maximum partition priority level, means for modifying said partition priority level further including means for limiting said partition priority level to a value no greater than said maximum partition priority level.

19. The task scheduler as claimed in claim 12 wherein said means for executing further includes means for executing said tasks of said application program using an interactive scheduling model.

20. The task scheduler as claimed in claim 12 wherein said means for executing further includes means for executing said tasks of said application program using a gang scheduling model.

21. The task scheduler as claimed in claim 12 wherein said means for executing further includes means for recursively scheduling tasks of said partition.

22. The task scheduler as claimed in claim 12 wherein said partition includes a time quantum for specifying a maximum length of time a task of said partition is executed in a single scheduling cycle.

* * * * *